(12) United States Patent
Lee et al.

(10) Patent No.: US 10,873,273 B2
(45) Date of Patent: Dec. 22, 2020

(54) RENEWABLE ENERGY RESOURCES INTEGRATING POWER CONVERSION APPARATUS

(71) Applicant: Hitachi, Ltd., Tokyo (JP)

(72) Inventors: Chia Tse Lee, Tokyo (JP); Akira Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/612,464

(22) PCT Filed: Mar. 21, 2018

(86) PCT No.: PCT/JP2018/011237
§ 371 (c)(1),
(2) Date: Nov. 11, 2019

(87) PCT Pub. No.: WO2018/230071
PCT Pub. Date: Dec. 20, 2018

(65) Prior Publication Data
US 2020/0099315 A1 Mar. 26, 2020

(30) Foreign Application Priority Data
Jun. 13, 2017 (JP) .................................. 2017-116145

(51) Int. Cl.
*H02M 7/5387* (2007.01)
*H02J 9/00* (2006.01)

(52) U.S. Cl.
CPC ..... *H02M 7/53871* (2013.01); *H02J 2300/20* (2020.01)

(58) Field of Classification Search
CPC .................. H02M 7/53871–53875; H02J 9/00
See application file for complete search history.

(56) References Cited

U.S. PATENT DOCUMENTS 6,567,282 B1 * 5/2003 Kikuchi .................. H02P 9/305
318/700
7,095,132 B2 * 8/2006 Kikuchi ................ F03D 7/0272
290/52

(Continued)

FOREIGN PATENT DOCUMENTS

EP   2 683 077 A1   1/2014
JP   2014-509179 A  4/2014

(Continued)

OTHER PUBLICATIONS

International Search Report (PCT/ISA/210) issued in PCT Application No. PCT/JP2018/011237 dated Jun. 5, 2018 with English translation (three (3) pages).

(Continued)

*Primary Examiner* — Thienvu V Tran
*Assistant Examiner* — Sisay G Tiku
(74) *Attorney, Agent, or Firm* — Crowell & Moring LLP

(57) ABSTRACT

An apparatus includes: an inverter converting generated power of renewable energy resources to predetermined alternating-current power for output to a power transmission network; a PWM control unit controlling the inverter; a first detecting unit detecting the input voltage and current to the inverter; a second detecting unit detecting the output voltage, current, and frequency of the inverter; a power change deciding unit calculating the input and output powers of the inverter and the difference therebetween from the voltage and current of each of the input and output detected by the detecting units, and calculating a correction output power command with reference to an output power command; and a virtual synchronous inertia control unit calculating a virtual inertia characteristic based on the voltage, current, and frequency of the output detected by the second detecting (Continued)

unit and the correction output power command, and outputting a reference command to a PWM control unit.

11 Claims, 15 Drawing Sheets

(56) References Cited

U.S. PATENT DOCUMENTS

| | | | | |
|---|---|---|---|---|
| 7,268,443 | B2* | 9/2007 | Kikuchi | F03D 7/042 290/44 |
| 8,523,296 | B2* | 9/2013 | Kikuchi | H02P 3/025 303/151 |
| 10,439,507 | B2* | 10/2019 | Ramamurthy | H02M 7/12 |
| 10,615,716 | B2* | 4/2020 | Zhong | H03H 7/0115 |
| 2014/0049228 | A1* | 2/2014 | Rodriguez Cortes | H02P 9/10 322/24 |
| 2019/0305555 | A1* | 10/2019 | Yin | H02P 21/143 |
| 2020/0212823 | A1* | 7/2020 | Gong | H02J 3/38 |

FOREIGN PATENT DOCUMENTS

| | | |
|---|---|---|
| JP | 2016-220396 A | 12/2016 |
| JP | 2016-226279 A | 12/2016 |
| WO | WO 2012/122874 A1 | 9/2012 |

OTHER PUBLICATIONS

Japanese-language Written Opinion (PCT/ISA/237) issued in PCT Application No. PCT/JP2018/011237 dated Jun. 5, 2018 (three (3) pages).

Alipoor et al., "Power System Stabilization Using Virtual Synchronous Generator With Alternating Moment of Inertia," IEEE Journal of Emerging and Selected Topics in Power Electronics, Jun. 2015, pp. 451-458, vol. 3, No. 2 (eight (8) pages).

* cited by examiner

| MODE COLLATION | MODE | ADJUSTMENT |
|---|---|---|
| $\omega_{PCS} > \omega_g$ AND $\omega_{PCS}$ IS INCREASING | Mode1 | $J = J_{normal}$ |
| $\omega_{PCS} > \omega_g$ AND $\omega_{PCS}$ IS DECREASING | Mode2 | $J = J_{small}$ |
| $\omega_{PCS} < \omega_g$ AND $\omega_{PCS}$ IS DECREASING | Mode3 | $J = J_{normal}$ |
| $\omega_{PCS} < \omega_g$ AND $\omega_{PCS}$ IS INCREASING | Mode4 | $J = J_{small}$ |

RENEWABLE ENERGY RESOURCES INTEGRATING POWER CONVERSION APPARATUS

BACKGROUND OF THE INVENTION

1. Field of the Invention

The present invention relates to a renewable energy resources integrating power conversion apparatus that converts power of renewable energy resources.

2. Description of the Related Art

From holding of the 21st Session of the Conference of the Parties to the United Nations Framework Convention on Climate Change (COP 21), the respective participating countries in the world in COP 21 are further promoting activity for integrating renewable energy resources typified by wind-generated power and solar-generated power into existing power resources.

To intend the integration of renewable energy resources, a power conversion apparatus of the renewable energy resources in a transmission network coupled at the respective bases, or grids, in a lattice manner and related technology thereof are essential. The reason for this is because the renewable energy resources are generally susceptible to sudden change in the environment and therefore power generated by the renewable energy resources at the above-described respective bases in a lattice manner needs to be adjusted and converted to be coupled to the transmission network.

In the near future, the mid-to-long-term plan of the integration of renewable energy resources is being realized and problems relating to the lowering of stability of power in the coupled transmission network are foreseen. This is because the power conversion apparatus of the renewable energy resources is susceptible to power fluctuation and does not have stable inertia as a synchronous machine like an existing power source using a synchronous generator mainly.

In the existing power systems, a synchronous machine is used in most of power plants. These synchronous machines have a rotor and rotate at a frequency that synchronizes with a frequency at the connecting point, or lattice point, to the power network. These rotors have moment of rotation with large inertia, or moment of inertia. Thus, when all synchronous machines rotate together, they stably rotate at 50 or 60 Hz that is the frequency at the connecting point, or lattice point, to the power network, with moment of rotation with very large inertia and stability.

However, as renewable energy resources connected to the power network from a lattice point increase, the stability of the power network decreases relatively. This is because the above-described power conversion apparatus of the renewable energy resources does not have inertia as the synchronous machine and behaves as if it were an individual power source with less cooperation at the connecting point, or lattice point, of the power network.

Against this problem, virtual synchronous inertia control of the power conversion apparatus is conceivable as one solution to improve the stability of the power network of the renewable energy resources.

The virtual synchronous inertia control brings characteristics of the synchronous machine to a control algorithm of power conversion. For this purpose, the virtual synchronous inertia control behaves as a synchronous generator having inertia that brings stability at the lattice point of the power network.

The virtual synchronous inertia control is known as a method for dynamically adjusting the moment of inertia that stabilizes oscillation of output power. However, in the situation in which power generation of renewable energy resources is suddenly lost, the output of the power conversion apparatus needs to be immediately limited in order to keep the power balance.

Manipulation of immediately limiting this output of the power conversion apparatus is carried out. In the period of the manipulation, the actual output power needs a reaction time in which operation is made in accordance with an output power command.

This situation or state causes very large divergence of energy between the input power and the output power of the power conversion apparatus. In conjunction with this, this situation becomes the cause of large deviation of the direct-current capacitor voltage from a voltage of a normal value.

Thus, the manipulation and operation of the power conversion apparatus often become unstable.

For this reason, a method for alleviating variation in the direct-current capacitor voltage while the output power of the power conversion apparatus is changed is demanded.

Such a power conversion apparatus is disclosed in JP-2014-509179-A, hereinafter referred to as Patent Document 1, for example.

The summary of Patent Document 1 includes a description that can be translated into an English description of "the present invention relates to a synchronous power controller based on a static power converter and the controller includes two main blocks referenced below: block 1, or electrical block, and block 2, or electromechanical block. Electrical block 1 (10) is formed of a virtual electrical characteristic control controller (11) and a virtual admittance controller (12) and electromechanical block 2 (10) is formed of a virtual electromotive force characteristic controller (21) and an inertia and damping factor controller (22)," and techniques of the synchronous power controller are disclosed therein.

Furthermore, in J. Alipoor et al., "Power system stabilization using virtual synchronous generator with alternating moment of inertia," in IEEE Journal of Emerging and Selected Topics in Power Electronics, vol. 3, no. 2, pp. 451-458, June 2015, hereinafter referred to as Non-Patent Document 1, a method is disclosed in which oscillation of an output terminal is stabilized by dynamically adjusting and controlling a moment-of-inertia value based on the state of the frequency of rotation of a virtual synchronous rotor.

SUMMARY OF THE INVENTION

However, the techniques disclosed in Patent Document 1 and Non-Patent Document 1 involve a problem that very large divergence of energy is still caused between the input power and the output power of a power conversion apparatus. In particular, there is a problem that the above-described manipulation and operation of the power conversion apparatus become unstable in the situation in which a difference from a power command value has arisen due to sudden lowering of generated power of renewable energy resources.

The present invention is created in view of the above-described problems and intends to provide a power conversion apparatus that alleviates divergence between the input power and the output power of the power conversion apparatus even when sudden lowering of generated power of renewable energy resources occurs, and carries out stable operation.

In order to solve the above-described problems, the present invention is configured as follows.

Specifically, a renewable energy resources integrating power conversion apparatus of the present invention includes: an inverter that converts generated power of renewable energy resources to predetermined alternating-current power and outputs the alternating-current power to a power transmission network; a pulse width modulation (PWM) control unit that controls the inverter; a first detecting unit that detects a voltage and a current of input to the inverter; a second detecting unit that detects a voltage, a current, and a frequency of output of the inverter; a power change deciding unit that calculates input power of the input side of the inverter, output power of the output side of the inverter, and a difference between the input power and the output power from the voltage and the current of each of the input and the output detected by the first and second detecting units, and calculates a correction output power command with reference to an output power command; and a virtual synchronous inertia control unit that calculates a virtual inertia characteristic based on the voltage, the current, and the frequency of the output detected by the second detecting unit and on the correction output power command, and outputs a reference command to the PWM control unit. A response time of the power change deciding unit with respect to change in the input power changes according to the total amount of change in the input power.

Furthermore, other units will be described in modes for carrying out the invention.

According to the present invention, it is possible to provide a power conversion apparatus that alleviates divergence between the input power and the output power of the power conversion apparatus even when sudden lowering of generated power of renewable energy resources occurs, and carries out stable operation.

DESCRIPTION OF THE PREFERRED EMBODIMENTS

Modes for carrying out the present invention, hereinafter represented as "embodiments," will be described below with reference to the drawings as appropriate.

First Embodiment of Present Invention

A renewable energy resources integrating power conversion apparatus, or power conversion apparatus, 100 according to a first embodiment of the present invention will be described with reference to drawings. The "renewable energy resources integrating power conversion apparatus" will be represented as "power conversion apparatus" as appropriate.

Figure 1:
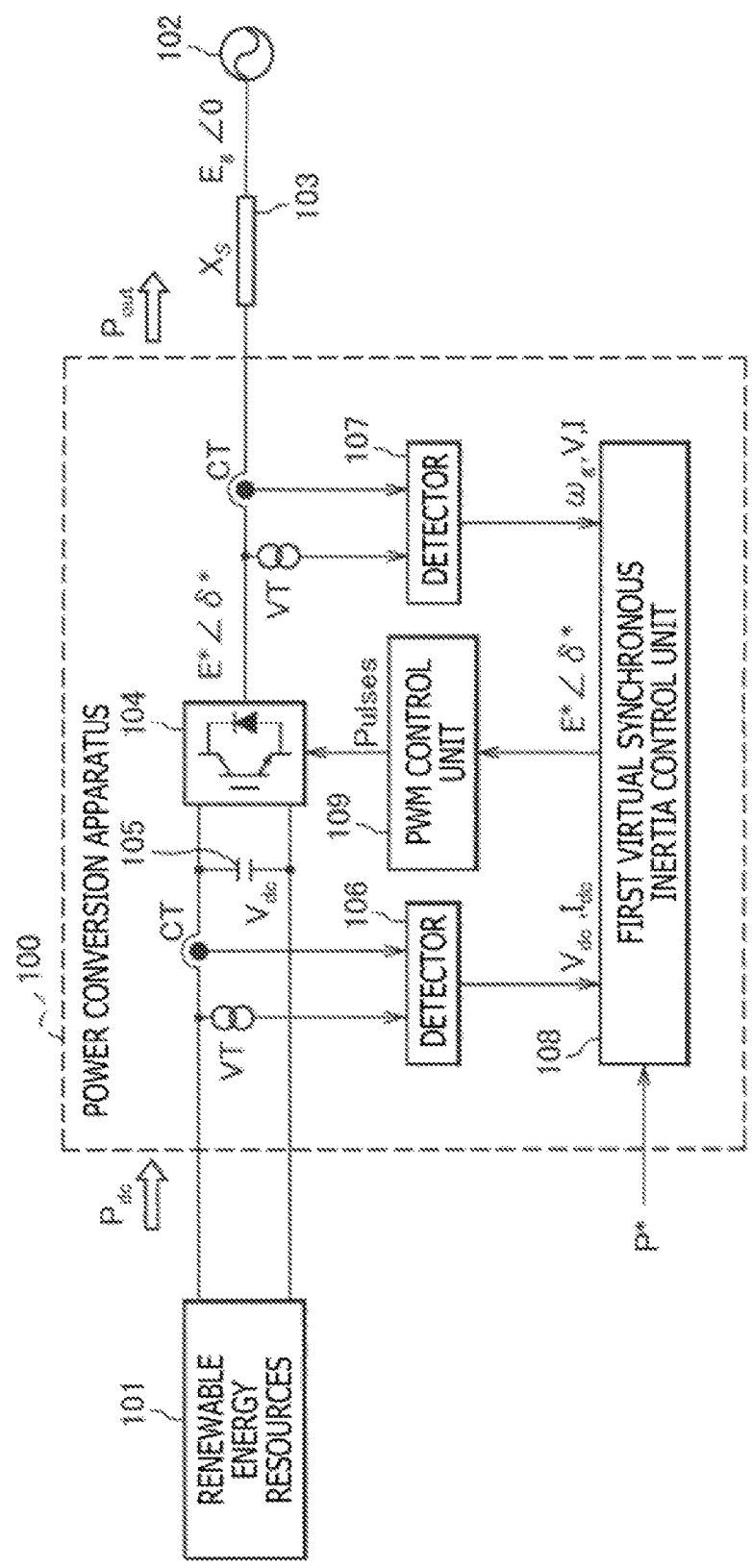
FIG. 1 is a diagram depicting one example of the configuration of a renewable energy resources integrating power conversion apparatus according to a first embodiment of the present invention and the relationship between connection to renewable energy resources and connection to a power transmission network.

FIG. 1 is a diagram depicting one example of the configuration of the renewable energy resources integrating power conversion apparatus 100 according to the first embodiment of the present invention and the relationship between connection to renewable energy resources, or a front-end of renewable energy resources, 101 and connection to a three-phase alternating-current power supply 102 that is a grid of a power transmission network.

Renewable energy resources typified by solar-generated power and wind-generated power are not directly connected to the power transmission network as they are. The reason for this is because, generally in generated power generated by the renewable energy resources, the frequency and the voltage are not necessarily stably generated because of change in the climate and so forth. For this reason, the power generated by the renewable energy resources is distributed to the power transmission network after being subjected to power conversion by the power conversion apparatus.

The power transmission network configured into a mesh shape has plural supply sources of power and the three-phase alternating-current power supply 102 is equivalent to one lattice point of the mesh shape. For this reason, the three-phase alternating-current power supply 102 that is one of the above-described supply sources of power will be represented as "three-phase alternating-current power supply that is a grid" or "three-phase alternating-current power supply grid" as appropriate.

Furthermore, when the renewable energy resources are viewed from the three-phase alternating-current power supply 102 that is a grid of the power transmission network, the original renewable energy resources are configured to include the renewable energy resources 101 that are the front-end of the renewable energy resources and the renewable energy resources integrating power conversion apparatus 100 that are the back-end of the renewable energy resources. However, hereinafter, simply the front-end will be represented and treated as "renewable energy resources 101" and the back-end will be represented and treated as "renewable energy resources integrating power conversion apparatus 100" for simplification of representation.

Moreover, in the renewable energy resources typified by solar power generation and wind power generation, supply of power is unstable as described above compared with thermal power generation, hydroelectric power generation, and nuclear power generation, which are existing main energy resources. However, when the renewable energy resources are viewed from the transmission network that distributes power, it is convenient that the renewable energy resources can be treated similarly to generators of thermal power generation, hydroelectric power generation, and nuclear power generation.

Therefore, the renewable energy resources integrating power conversion apparatus 100 that is a buffer to convert power of the renewable energy resources 101 is regarded as a synchronous generator that is used for thermal power generation, hydroelectric power generation, nuclear power generation, and so forth and has inertia, thereby treating the renewable energy resources integrating power conversion apparatus 100 as a virtual synchronous generator in some cases.

For this reason, in the renewable energy resources integrating power conversion apparatus 100, concepts and terms of virtual synchronous generator, virtual synchronous inertia, moment of inertia, governor or regulator, rotor angular velocity or virtual rotor angle, mechanical input, and so forth are introduced as appropriate.

<<Outline of Renewable Energy Resources Integrating Power Conversion Apparatus 100 of First Embodiment>>

In FIG. 1, the renewable energy resources integrating power conversion apparatus, or power conversion apparatus, 100 includes: an inverter, or direct-current-alternating-current conversion, 104; a direct-current capacitor 105; detectors, or voltage-current detectors, 106 and 107; a first virtual synchronous inertia control unit 108; and a PWM control unit, or pulse width control unit, 109.

Furthermore, to the renewable energy resources integrating power conversion apparatus 100, power of active power, or active input power, $P_{dc}$ composed mainly of direct-current power is input from the renewable energy resources 101 in the original state in which renewable energy resources typified by solar-generated power, wind-generated power, and so forth are generated.

The renewable energy resources integrating power conversion apparatus 100 virtually controls inertia of the input power, or active power $P_{dc}$, and outputs the resulting power as output power $P_{out}$ to the three-phase alternating-current power supply 102 that is a grid of the power transmission network. The three-phase alternating-current power supply 102 that is a grid of the power transmission network has impedance $X_s$ 103 as the grid as viewed from the side of the renewable energy resources integrating power conversion apparatus 100. Furthermore, in the three-phase alternating-current power supply 102, the voltage as the grid is defined as Eg and a virtual rotor angle $\delta$ is defined as 0 as the basis. Therefore, the characteristic of the voltage and phase, or virtual rotor angle, of the three-phase alternating-current power supply 102 at the grid is represented as "Eg∠0."

The renewable energy resources integrating power conversion apparatus 100 converts the active power $P_{dc}$ composed mainly of the direct-current power of the renewable energy resources 101 in the initial state in which power of renewable energy resources is generated to alternating-current power. In addition, the renewable energy resources integrating power conversion apparatus 100 carries out virtual synchronous inertia control for the power of the renewable energy resources 101 and outputs the output power $P_{out}$ to the three-phase alternating-current power supply 102 that is a grid of the power transmission network as stable power.

<<Details of Renewable Energy Resources Integrating Power Conversion Apparatus 100 of First Embodiment of Present Invention>>

In FIG. 1, the power, or active input power, $P_{dc}$ input from the renewable energy resources 101 is input to the inverter 104 that carries out direct-current-alternating-current conversion through the direct-current capacitor 105. The inverter 104 outputs the power, or active output power, $P_{out}$ converted to three-phase alternating-current power. The direct-current capacitor 105 smoothes and stabilizes the voltage supplied from the renewable energy resources 101.

Furthermore, the detector, or voltage-current detector as a first detecting unit, 106 detects a voltage $V_{dc}$ and a current $I_{dc}$ of the power $P_{dc}$ input to the inverter 104. The detector, or voltage-current detector as a second detecting unit, 107 detects a voltage V and a current I of the power $P_{out}$ output by the inverter 104 and an output frequency $\omega_g$ of the voltage V.

To the first virtual synchronous inertia control unit 108, the above-described voltage $V_{dc}$, current $I_{dc}$, voltage V, current I, output frequency $\omega_g$, and an output power command P* are input. Then, the first virtual synchronous inertia control unit 108 generates a reference command $E^*\angle\delta^*$ and inputs it to the PWM control unit 109. "$E^*\angle\delta^*$" represents a reference command of an output voltage E and a virtual rotor angle $\delta$ of the virtual synchronous generator.

The PWM control unit 109 generates pulses necessary for control of the inverter 104 in accordance with the reference command $E^*\angle\delta^*$ to carry out driving control of the inverter 104.

Details of the inverter 104 and the first virtual synchronous inertia control unit 108 will be described later.

<<Inverter 104 of Present Invention>>

Figure 2:
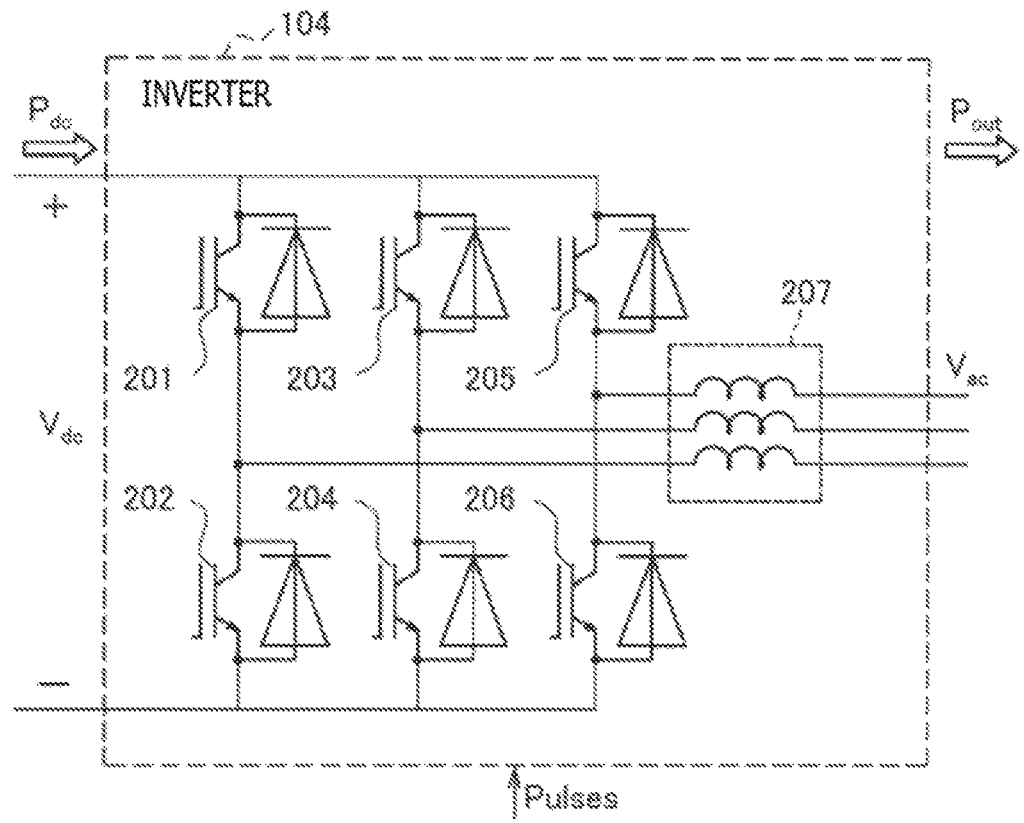
FIG. 2 is a diagram depicting a configuration example of an inverter included in the renewable energy resources integrating power conversion apparatus according to the first embodiment of the present invention.

FIG. 2 is a diagram depicting a configuration example of the inverter, or direct-current-alternating-current conversion, 104 included in the renewable energy resources integrating power conversion apparatus 100 according to the first embodiment of the present invention.

In FIG. 2, the inverter 104 includes insulated gate bipolar transistors (IGBTs) 201 to 206 that are switching devices and plural reactors 207. An antiparallel diode is connected to each of the IGBTs 201 to 206.

For the IGBTs 201 to 206, turning-on/off (ON/OFF) and the pulse width of each IGBT are integratedly controlled by a control signal generated by the PWM control unit 109.

By this integrated control, the direct-current voltage $V_{dc}$ across the direct-current capacitor 105, see FIG. 1, is converted to three-phase alternating-current voltages $V_{ac}$.

Furthermore, these three-phase alternating-current voltages $V_{ac}$ are output via the plural reactors 207. The plural reactors 207 reduce the influence of ripple, or noise, generated due to switching of the IGBTs 201 to 206.

<<First Virtual Synchronous Inertia Control Unit 108 of First Embodiment of Present Invention>>

Figure 3:
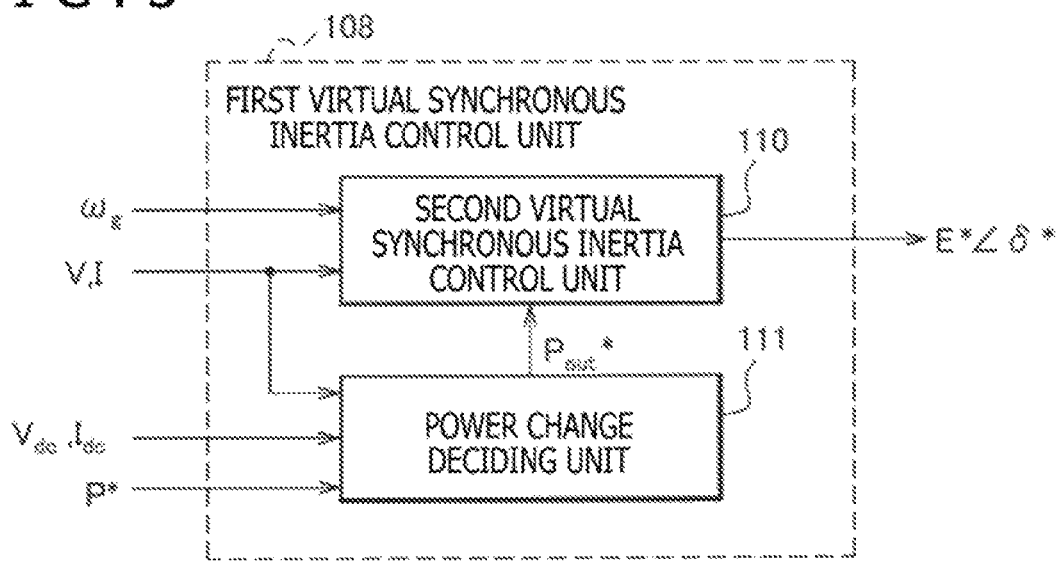
FIG. 3 is a diagram depicting a configuration example of a first virtual synchronous inertia control unit included in the renewable energy resources integrating power conversion apparatus according to the first embodiment of the present invention.

FIG. 3 is a diagram depicting a configuration example of the first virtual synchronous inertia control unit 108 included in the renewable energy resources integrating power conversion apparatus 100 according to the first embodiment of the present invention.

In FIG. 3, the first virtual synchronous inertia control unit 108 is configured to include a second virtual synchronous inertia control unit 110 and a power change deciding unit 111.

To the power change deciding unit 111, the voltage $V_{dc}$ and the current $I_{dc}$ on the input side of the inverter 104 detected by the detector, or voltage-current detector, 106, the voltage V and the current I on the output side of the inverter 104 detected by the detector, or voltage-current detector, 107, and the output power command P* are input.

Then, the power change deciding unit 111 generates a correction output power command $P_{out}^*$ based on these input signals and command "$V_{dc}, I_{dc}, V, I, P^*$" and inputs this correction output power command $P_{out}^*$ to the second virtual synchronous inertia control unit 110.

The second virtual synchronous inertia control unit 110 carries out control with the voltage V, the current I, and the output frequency $\omega_g$ on the output side of the inverter 104 and the above-described correction output power command $P_{out}^*$ and outputs the reference command $E^*\angle\delta^*$.

The second virtual synchronous inertia control unit 110 is a simple virtual synchronous inertia control unit as a first comparative example as described later.

In contrast, the first virtual synchronous inertia control unit 108 used for the renewable energy resources integrating power conversion apparatus 100 of the first embodiment of the present invention carries out more excellent virtual synchronous inertia control by precisely carrying out control by further using the power change deciding unit 111 in addition to the above-described second virtual synchronous inertia control unit 110.

Thus, explanation of detailed functions and operation of the first virtual synchronous inertia control unit 108 depicted in FIG. 3 will be made again after the configuration, functions, and operation of the second virtual synchronous inertia control unit 110 depicted as the first comparative example are explained.

The first virtual synchronous inertia control unit 108 depicted in FIG. 3 has functions of virtual synchronous inertia control due to the second virtual synchronous inertia control unit 110 and has functions of active power control due to the power change deciding unit 111.

However, the effect of the functions of the active power control becomes clear not with only the power change deciding unit 111 but based on a combination with the second virtual synchronous inertia control unit 110. Therefore, as depicted in FIG. 3, the second virtual synchronous inertia control unit 110 and the power change deciding unit 111 are represented in conjunction.

First Comparative Example

The configuration, functions, and operation of the second virtual synchronous inertia control unit 110 as the first comparative example will be described.

<<Configuration of Second Virtual Synchronous Inertia Control Unit 110 of First Comparative Example>>

Figure 4:
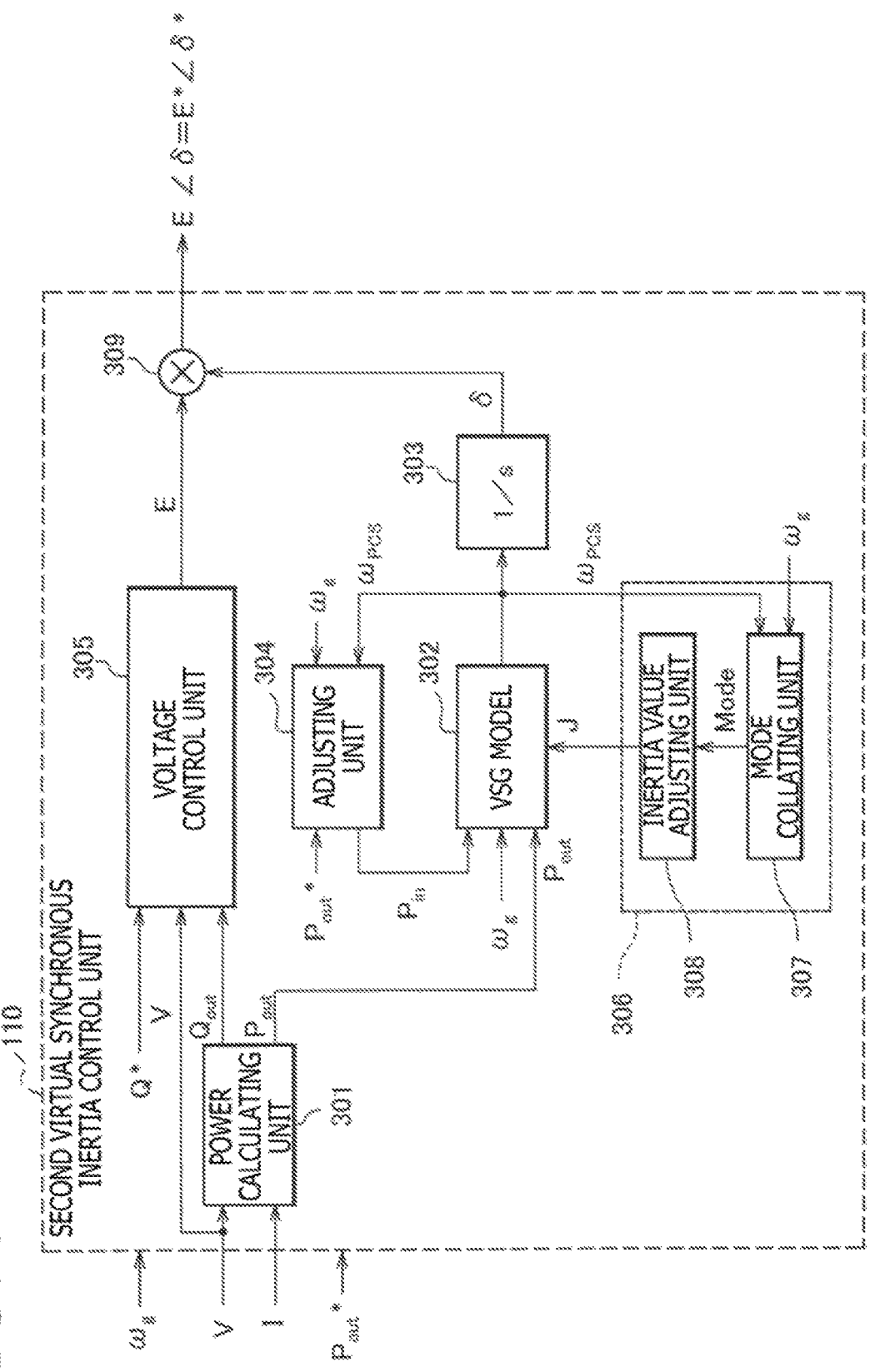
FIG. 4 is a diagram depicting the configuration of a second virtual synchronous inertia control unit of a first comparative example.

FIG. 4 is a diagram depicting the configuration of the second virtual synchronous inertia control unit 110 of the first comparative example.

In FIG. 4, the second virtual synchronous inertia control unit 110 is configured to include a power calculating unit 301, a virtual synchronous generator (VSG) model 302, an integrating unit, or 1/s, 303, a regulating unit, or governor, 304, a voltage control unit 305, a mode-corresponding-inertia adjusting unit 306, and a synthesizing unit, or multiplier, 309.

Furthermore, the mode-corresponding-inertia adjusting unit 306 includes a mode collating unit 307 and an inertia value adjusting unit 308.

Moreover, to the second virtual synchronous inertia control unit 110, the voltage V, the current I, and the output frequency $\omega_g$ on the output side of the inverter 104 detected by the detector, or voltage-current detector, 107 and the above-described correction output power command $P_{out}^*$ are input. In addition, the second virtual synchronous inertia control unit 110 outputs the reference command $E^*\angle\delta^*$.

To the power calculating unit 301, the voltage V and the current I of the output of the inverter 104 are input. Then, the power calculating unit 301 calculates the active power, or active output power, $P_{out}$ and reactive power, or reactive output power, $Q_{out}$ of the output of the renewable energy resources integrating power conversion apparatus 100.

To the VSG model 302, the above-described active power $P_{out}$ of the output, the output frequency $\omega_g$, power, or mechanical input, $P_{in}$ output by the regulating unit, or governor, 304, and moment of inertia J output by the mode-corresponding-inertia adjusting unit 306 are input. Then, the VSG model 302 calculates angular velocity $\omega_{PCS}$ of the virtual rotor. Then, the VSG model 302 supplies a signal of this angular velocity $\omega_{PCS}$ of the rotor to the integrating unit 303, the regulating unit 304, and the mode-corresponding-inertia adjusting unit 306.

To the regulating unit 304, the above-described output power command $P_{out}^*$, the output frequency $\omega_g$, and the signal of the angular velocity $\omega_{PCS}$ of the rotor are input. Then, the regulating unit, or governor, 304 outputs the power, or mechanical input, $P_{in}$ and supplies it to the VSG model 302.

To the mode-corresponding-inertia adjusting unit 306, the signal of the above-described angular velocity $\omega_{PCS}$ of the rotor and the output frequency $\omega_g$ are input. The mode-corresponding-inertia adjusting unit 306 calculates the moment of inertia J. Then, the mode-corresponding-inertia adjusting unit 306 supplies a signal of the above-described moment of inertia J to the VSG model 302.

Furthermore, the integrating unit, or 1/s, 303 integrates the signal of the angular velocity $\omega_{PCS}$ of the rotor as the output of the VSG model 302 to calculate the angle of the virtual rotor, or virtual rotor angle, δ. Then, the integrating unit 303 outputs a signal of this virtual rotor angle δ to the synthesizing unit 309.

To the voltage control unit 305, the voltage V on the output side of the inverter 104, the reactive power $Q_{out}$ calculated by the power calculating unit 301, and a reactive power command Q* are input. The voltage control unit 305 calculates the output voltage E. Then, the voltage control unit 305 outputs a signal of this output voltage E to the synthesizing unit 309.

Moreover, the synthesizing unit 309 synthesizes the output voltage E and the virtual rotor angle δ to generate a PWM control signal E∠δ. This PWM control signal E∠δ becomes the PWM control command E*∠δ* without any change.

The second virtual synchronous inertia control unit 110 outputs the PWM control command E*∠δ*.

Between the VSG model 302 and the regulating unit, or governor, 304, a signal loops due to the signal of the angular velocity of the rotor, or rotor angular velocity, $\omega_{PCS}$ and the signal of the power, or mechanical input, $P_{in}$.

Furthermore, between the VSG model 302 and the mode-corresponding-inertia adjusting unit 306, a signal loops due to the signal of the angular velocity $\omega_{PCS}$ of the rotor and the signal of the moment of inertia J.

Due to the loop of these signals, the arithmetic operation converges and a solution is obtained.

Details of the VSG model 302 will be described later.

Moreover, details of a model of the regulating unit, or governor, 304 will be described later.

Furthermore, details of the voltage control unit 305 and a voltage control model will be described later.

In addition, details of the mode-corresponding-inertia adjusting unit 306 will be described later.

Moreover, details of the principle of adjustment of the moment of inertia J will be described later.

<<VSG Model 302 of First Comparative Example>>

The VSG model 302 of the first comparative example in FIG. 4 is implemented in accordance with the following expression (1).

$$P_{in} - P_{out} = J \cdot \omega_{PCS} \cdot \frac{d\omega_{PCS}}{dt} + D \cdot (\omega_{PCS} - \omega_g) \quad (1)$$

Expression (1) is represented based on the characteristic of the rotor of the virtual synchronous machine.

In expression (1), $P_{in}$ is the mechanical input, or power. $P_{out}$ is the active power of the output. J is the moment of inertia. $\omega_{PCS}$ is the angular velocity of the rotor. $\omega_g$ is the output frequency. D is a vibration suppression factor of the rotation.

The reason why the VSG model 302 is represented with the above-described respective elements in the above expression (1) is because, as the VSG model 302, an actual machine, or synchronous generator, is not included in the system. The change amount of each element relates to the virtual synchronous generator and the rotor thereof.

<<Model of Regulating Unit, or Governor, 304 of First Comparative Example>>

In control of the synchronous generator, the regulating unit, or governor, 304 is carried out for controlling the power.

In the virtual synchronous inertia control of the first comparative example, the regulating unit, or governor, 304 is implemented based on a linear relationship expression of damping represented by the following expression (2).

$$P_{in} = P^*_{out} - K_{gov}(\omega_{PCS} - \omega_g) \quad (2)$$

Here, $P_{in}$ is the mechanical input power, or power. $P_{out}^*$ is the correction output power command. $\omega_{PCS}$ is the integrated angular velocity of the rotor. $\omega_g$ is the output frequency. $K_{gov}$ is a constant of proportionality relating to the regulating unit, or governor, 304.

In expression (2), "$P^*_{out}$" and "$P_{out}^*$" are deemed as synonyms for convenience of representation.

<<Voltage Control Model of Voltage Control Unit 305 of First Comparative Example>>

In FIG. 4, the voltage control unit 305 controls the reactive power, or reactive output power, $Q_{out}$ at the output end in accordance with the reactive power command value Q*. Furthermore, the reactive power command value Q* adjusts the output voltage E at the output terminal of the voltage control unit 305 by using the detected output voltage V and the reactive power $Q_{out}$ at the output end.

This control is carried out by proportional and integral (PI) control based on the following expression (3).

$$E = V + K_{PQ} \cdot (Q^* - Q_{out}) + K_{IQ} \int (Q^* - Q_{out}) dt \quad (3)$$

Here, as described above, E is the output voltage of the voltage control unit 305. V is the voltage on the output side of the power conversion apparatus, or renewable energy resources integrating power conversion apparatus, 100 detected by the detector 107. Q* is the reactive power command value. $Q_{out}$ is the reactive power at the output end calculated by the power calculating unit 301. Furthermore, $K_{PQ}$ is a constant of proportionality relating to proportional control and $K_{IQ}$ is a constant of proportionality relating to integral control.

<<Mode-Corresponding-Inertia Adjusting Unit 306 of First Comparative Example>>

The mode-corresponding-inertia adjusting unit 306 of the first comparative example in FIG. 4 is configured to include the mode collating unit 307 and the inertia value adjusting unit 308.

To the mode collating unit 307, the angular velocity $\omega_{PCS}$ of the rotor and the angular velocity $\omega_g$ based on the frequency of the output voltage detected by the detector 107, or output voltage of the grid, are input. The mode collating unit 307 selects a mode based on a relationship to be described later and outputs this mode "Mode" to the inertia value adjusting unit 308.

The inertia value adjusting unit 308 dynamically changes and selects the moment of inertia J based on the selected mode and transmits the moment of inertia J to the VSG model 302 of the first comparative example.

By optimizing the moment of inertia J in the second virtual synchronous inertia control unit 110 of the first comparative example in this manner, oscillation at the output terminal of the renewable energy resources integrating power conversion apparatus of the first comparative example using the second virtual synchronous inertia control unit 110 of the first comparative example is prevented and stabilization is achieved.

<<Principle of Adjustment of Moment of Inertia J of First Comparative Example>>

Figures 5A, 5B:
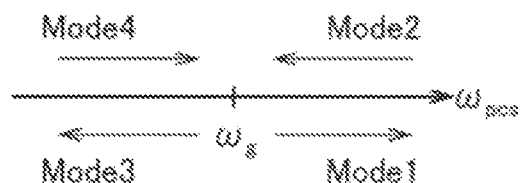
FIG. 5A is a diagram depicting the relation between mode collation and the adjustment result thereof for depicting the principle of adjusting moment of inertia J of the first comparative example.
FIG. 5B is a diagram depicting the relation of the respective modes for depicting the principle of adjusting the moment of inertia J of the first comparative example.

FIG. 5A and FIG. 5B are diagrams depicting the principle of adjusting the moment of inertia J of the first comparative example.

FIG. 5A is a diagram depicting the relation between mode collation and the adjustment result thereof for depicting the principle of adjusting the moment of inertia J of the first comparative example. FIG. 5B is a diagram depicting the relation of the respective modes for depicting the principle of adjusting the moment of inertia J of the first comparative example.

In FIG. 5A, the respective factors of the mode collation of the mode collating unit 307, see FIG. 4, the mode settled through the mode collation, and the adjustment result, or adjustment, of the inertia value adjusting unit 308, see FIG. 4, are depicted.

As depicted in FIG. 5A, the angular velocity $\omega_{PCS}$ of the rotor is compared with the frequency, or angular velocity, $\omega_g$ of the output of the inverter 104, see FIG. 1, i.e. the three-phase alternating-current power supply 102, see FIG. 1, which is a connecting point, or grid as a lattice point, to the power transmission network, by the mode collation, or mode collating unit 307.

Depending on the result of this comparison and whether the angular velocity $\omega_{PCS}$ of the rotor is increasing or decreasing, the comparison result is determined by the mode collating unit 307.

In FIG. 5A, mode "Mode 1" is the case in which $\omega_{PCS} > \omega_g$ is satisfied and $\omega_{PCS}$ is increasing in the mode collation, or mode collating unit 307. At this time, $J_{normal}$ in the normal case is selected as the moment of inertia J.

Furthermore, mode "Mode 2" is the case in which $\omega_{PCS} > \omega_g$ is satisfied and $\omega_{PCS}$ is decreasing in the mode collation. At this time, $J_{small}$ with a smaller value than in the normal case is selected as the moment of inertia J.

Moreover, mode "Mode 3" is the case in which $\omega_{PCS} < \omega_g$ is satisfied and $\omega_{PCS}$ is decreasing in the mode collation. At this time, $J_{normal}$ in the normal case is selected as the moment of inertia J.

In addition, mode "Mode 4" is the case in which $\omega_{PCS} < \omega_g$ is satisfied and $\omega_{PCS}$ is increasing in the mode collation. At this time, $J_{small}$ with a smaller value than in the normal case is selected as the moment of inertia J.

$J_{normal}$ in the normal case also means that the moment of inertia J used in the normal case is not changed.

In FIG. 5B, the relationship among $\omega_{PCS}$, $\omega_g$, and the modes "Mode 1 to Mode 4" is diagrammatically represented. Furthermore, rightward arrows given to the vicinity of Mode 1 and Mode 4 indicate that $\omega_{PCS}$ is increasing, and leftward arrows given to the vicinity of Mode 2 and Mode 3 indicate that $\omega_{PCS}$ is decreasing.

Characteristics using the second virtual synchronous inertia control unit 110 of the first comparative example depicted with reference to the above FIG. 4, FIG. 5A, and FIG. 5B will be described later with reference to FIG. 8 of the second comparative example and FIG. 9 of the first comparative example.

However, the characteristics described with FIG. 8 of the second comparative example and FIG. 9 of the first comparative example still have points of improvement like ones to be described later.

For this reason, next, the first embodiment of the present invention to which further improvements are added will be described.

<<Power Change Deciding Unit 111 of First Embodiment of Present Invention>>

Next, a detailed description will be made about the power change deciding unit 111, see FIG. 3 and FIG. 6, in the first virtual synchronous inertia control unit 108 included in the renewable energy resources integrating power conversion apparatus 100, see FIG. 1, according to the first embodiment of the present invention. The power change deciding unit 111 is a constituent element that does not exist in the second virtual synchronous inertia control unit 110 of the above-described first comparative example and in the first comparative example itself.

Figure 6:
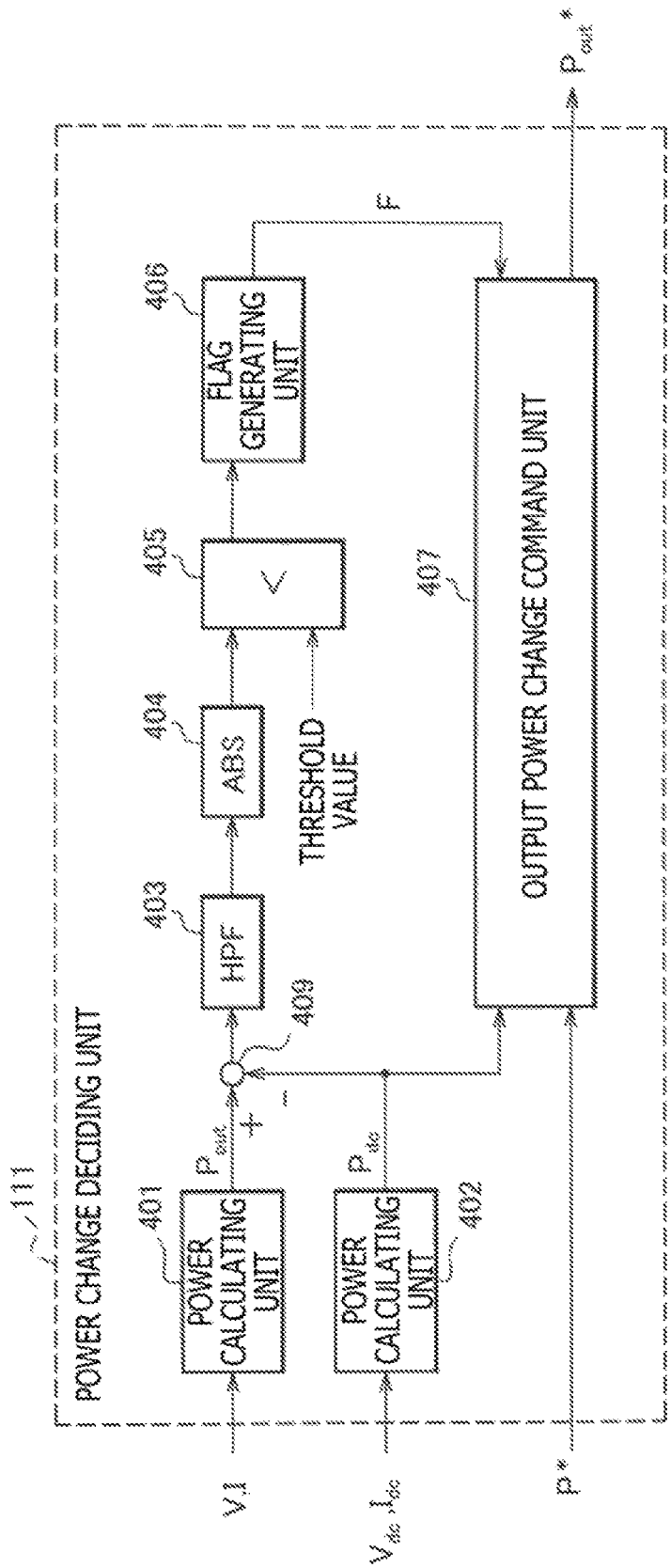
FIG. 6 is a diagram depicting one example of the configuration of a power change deciding unit according to the first embodiment of the present invention.

FIG. 6 is a diagram depicting one example of the configuration of the power change deciding unit 111 according to the first embodiment of the present invention. As described above, a characteristic of the first embodiment is using the first virtual synchronous inertia control unit 108 including the second virtual synchronous inertia control unit 110 and the power change deciding unit 111 and therefore the power change deciding unit 111 plays an important role.

In FIG. 6, the power change deciding unit 111 is configured to include power calculating units 401 and 402, a high-pass filter (HPF) 403, an absolute value calculating unit, or ABS, 404, a threshold value comparing-determining unit 405, a flag generating unit 406, and an output power change command unit 407.

Furthermore, to the power change deciding unit 111, as described in FIG. 3, the voltage $V_{dc}$ and the current $I_{dc}$ on the input side of the inverter 104 detected by the detector, or voltage-current detector, 106, the voltage V and the current I on the output side of the inverter 104 detected by the detector 107, and the output power command P* are input.

Then, the power change deciding unit 111 generates the correction output power command $P_{out}$* based on these input signals and command "$V_{dc}$, $I_{dc}$, V, I, P*" and supplies the correction output power command $P_{out}$* to the second virtual synchronous inertia control unit 110.

To the power calculating unit, or first power calculating unit, 401, the voltage V and the current I of the output by the inverter 104, see FIG. 1, detected by the detector 107 are input. Then, the power calculating unit 401 calculates the active power, or active output power, $P_{out}$ of the output of the renewable energy resources integrating power conversion apparatus 100.

To the power calculating unit, or second power calculating unit, 402, the voltage $V_{dc}$ and the current $I_{dc}$ on the input side of the inverter 104 detected by the detector 106 are input. Then, the power calculating unit 402 calculates the active power, or active input power, $P_{dc}$ of the input of the renewable energy resources integrating power conversion apparatus 100.

The active power $P_{out}$ of the output of the renewable energy resources integrating power conversion apparatus 100 and the active power $P_{dc}$ of the input are each input to a difference unit 409.

The difference between the active power $P_{out}$ of the output and the active power $P_{dc}$ of the input is detected in the difference unit 409. The output of the difference unit 409 is input to the HPF 403.

A high-frequency, or noise, component is removed by the HPF 403. The accuracy in the next step is improved due to the removal of the high-frequency component.

The output of the HPF 403 is input to the absolute value calculating unit, or ABS, 404. The absolute value of the signal input to the absolute value calculating unit, or ABS, 404 is calculated by the absolute value calculating unit 404. The reason why the absolute value is taken is because there are two kinds of magnitude relationship between the output power $P_{out}$ and the input power $P_{dc}$.

The output signal of the absolute value calculating unit 404 is input to one input terminal of the threshold value comparing-determining unit 405. A threshold value defined in advance is input to the other input terminal of the threshold value comparing-determining unit 405. In the threshold value comparing-determining unit 405, the output signal of the above-described absolute value calculating unit 404 is compared with the above-described threshold value defined in advance.

If the output signal of the absolute value calculating unit, or ABS, 404 is smaller than or equal to the above-described threshold value, the intended power conversion manipulation is continuously carried out without any change.

However, if the output signal of the absolute value calculating unit, or ABS, 404 is larger than the threshold value, the intended power conversion manipulation needs to be changed.

If this power conversion manipulation is not changed, the state in which the output signal of the absolute value calculating unit 404 is larger than the threshold value continues and the state in which the direct-current voltage of the direct-current capacitor 105, see FIG. 1, continues to change occurs, leading to a result that the power conversion apparatus stops the operation.

For this reason, if the output signal of the absolute value calculating unit, or ABS, 404 is larger than the threshold value in the threshold value comparing-determining unit 405, the flag generating unit 406 is activated and actuated to set a flag signal F of warning of the state. Then, the flag generating unit 406 sends the flag signal F to the output power change command unit 407.

To the output power change command unit 407, the above-described flag signal F, the active input power $P_{dc}$, which is the output signal of the power calculating unit 402, and the output power command P* are input. The output power change command unit 407 refers to the above-described three signals and outputs the correction output power command $P_{out}$*. Furthermore, setting of the correction output power command $P_{out}$* is initialized.

<<Output Power Change Command Unit 407 of First Embodiment of Present Invention>>

Next, detailed configuration and operation of the above-described output power change command unit 407 will be described.

Figure 7A:
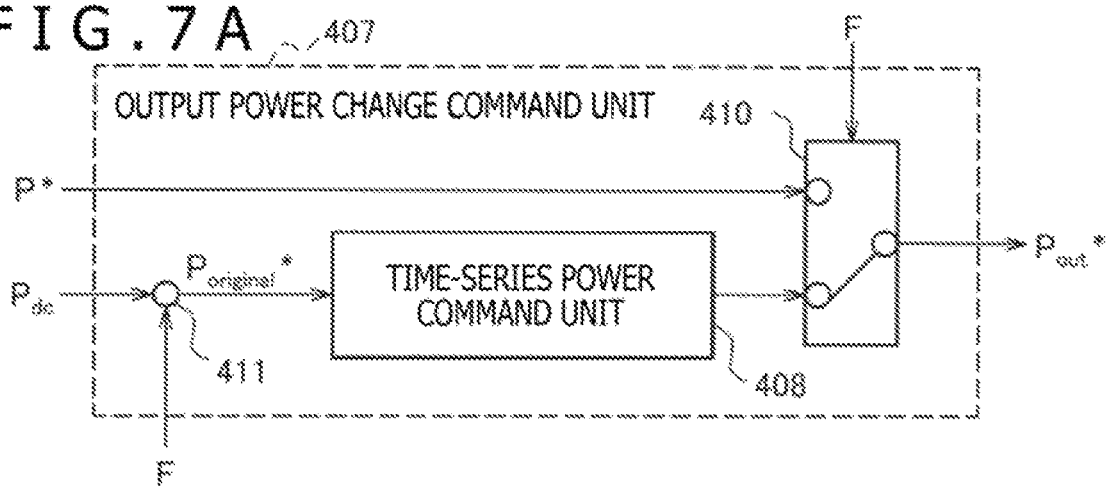
FIG. 7A is a diagram depicting a configuration example of an output power change command unit according to the first embodiment of the present invention.

FIG. 7A is a diagram depicting a configuration example of the output power change command unit 407 according to the first embodiment of the present invention.

Figure 7B:
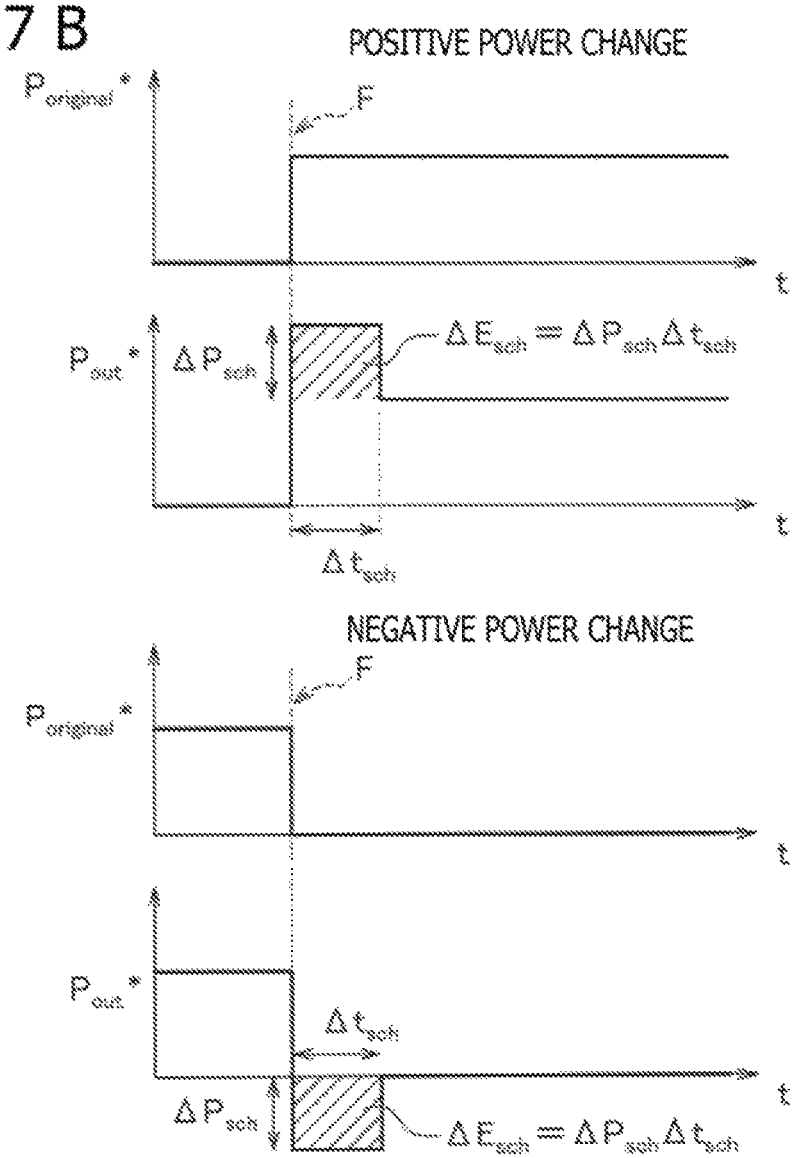
FIG. 7B explains the operation of the output power change command unit according to the first embodiment of the present invention.

FIG. 7B is a diagram depicting the operation of the output power change command unit 407 according to the first embodiment of the present invention.

The output power change command unit 407 is included in the power change deciding unit 111 of the first virtual synchronous inertia control unit 108 included in the renewable energy resources integrating power conversion apparatus 100 according to the first embodiment of the present invention.

In FIG. 7A, the output power change command unit 407 has a time-series power command unit 408, a switching unit 410, and a gate unit 411. Furthermore, to the output power change command unit 407, the output power command P*, the active input power $P_{dc}$ from the renewable energy resources 101, and the flag signal F from the flag generating unit 406 are input. Then, the correction output power command $P_{out}$* is output from the output power change command unit 407.

The gate unit 411 is opened and closed by the flag signal F. The signal of the active input power $P_{dc}$ is input to the input side of the gate unit 411 and an original output power command $P_{original}$* is obtained on the output side.

The original output power command $P_{original}$* is input to a first terminal of the time-series power command unit 408 and the signal is converted in the time-series power command unit 408 as described later with FIG. 7B and is output as the correction output power command $P_{out}$* from a second terminal.

The output power command P* is input to a first terminal of the switching unit 410 and the correction output power command $P_{out}$* of the output of the time-series power command unit 408 is input to a second terminal. Furthermore, in the switching unit 410, switching of the signal between the first terminal and the second terminal is controlled by the flag signal F.

In the switching unit 410, if the flag signal F is not set, the output power command P* of the first terminal is selected as a normal state. Then, the output power command P* is output as the correction output power command $P_{out}$* as it is.

Furthermore, if the flag signal F is set, power change is required and the active input power $P_{dc}$ from the renewable energy resources 101 passes through the gate unit 411 and becomes the original output power command $P_{original}$* to be input to the time-series power command unit 408. As described above, the time-series power command unit 408 converts the original output power command $P_{original}$* to the correction output power command $P_{out}$*.

Then, in the switching unit 410, because the flag signal F is set, the correction output power command $P_{out}$* that reflects a time-series power command, or command of the time-series power command unit 408, of the second terminal is output as the output signal of the switching unit 410.

In other words, when the flag signal F is set at the flag generating unit 406 in FIG. 6 and divergence of the active power is detected, the above-described divergence of the active power is adjusted at a higher degree when the active input power $P_{dc}$ from the renewable energy resources 101 is used as the original output power command $P_{original}$* than with a method in which unstableness of the voltage of the direct-current capacitor 105 due to imbalance of the active power is prevented by the output power command P* in the normal state.

As above, changing the output power command servers as a solution for suppressing imbalance of the active power and stabilizing the active power.

However, in the transition period of the output power change command, there is a need to deal with large divergence of the direct-current voltage of the direct-current capacitor 105.

Therefore, in the time-series power command, or time-series power command unit 408, specifically, a method for alleviating the large divergence of the direct-current voltage of the direct-current capacitor 105 in the above-described transition period needs to be employed.

FIG. 7B depicts a specific countermeasure in the above-described transition period.

In FIG. 7B, the case in which the original output power command $P_{original}*$ is changed to the positive side and the case in which it is changed to the negative side are represented. The case in which the original output power command $P_{original}*$ is changed to the positive side is depicted on the upper side of FIG. 7B and the case in which it is changed to the negative side is depicted on the lower side of FIG. 7B.

As depicted on the upper side of FIG. 7B, or positive power change, when the original output power command $P_{original}*$ is changed to the positive side, or positive power change, a command is made to increase the correction output power command $P_{out}*$ by $\Delta P_{sch}$ in a period of a time $\Delta t_{sch}$ from the change point of the original output power command $P_{original}*$ to the positive side. Furthermore, energy higher by $\Delta E_{sch}=\Delta P_{sch} \cdot \Delta t_{sch}$ is supplied in the period of a time $\Delta t_{sch}$ and thereafter the correction output power command $P_{out}*$ is set to the same power amount as the original output power command $P_{original}*$.

As above, by supplying energy higher by $\Delta E_{sch}=\Delta P_{sch} \cdot \Delta t_{sch}$ at the change point, the large divergence of the voltage at the direct-current capacitor 105 in the transition period is alleviated.

Furthermore, as depicted on the lower side of FIG. 7B depicting a negative power change, when the original output power command $P_{original}*$ is changed to the negative side, or a negative power change, a command is made to decrease the correction output power command $P_{out}*$ by $\Delta P_{sch}$ in a period of the time $\Delta t_{sch}$ from the change point of the original output power command $P_{original}*$ to the negative side. Furthermore, energy lower by $\Delta P_{sch}=\Delta P_{sch} \cdot \Delta t_{sch}$ is supplied in the period of a time $\Delta t_{sch}$ and thereafter the correction output power command $P_{out}*$ is set to the same power amount as the original output power command $P_{original}*$.

As above, by supplying energy lower by $\Delta E_{sch}=\Delta P_{sch} \cdot \Delta t_{sch}$ at the change point, the large divergence of the voltage at the direct-current capacitor 105 in the transition period is alleviated.

The time $\Delta t_{sch}$ of the period in which the higher or lower energy is supplied at the change point depends on the response time of the dynamic response, or dynamic response time, of the renewable energy resources integrating power conversion apparatus 100, which is the power conversion apparatus.

Furthermore, the active power $\Delta P_{sch}$ supplied with a larger or smaller power amount depends on compensation energy $\Delta E_{sch}$ in the time $\Delta t_{sch}$. In other words, the response time with respect to the input change of the power change deciding unit changes according to the total amount of change in the input power.

Moreover, the time of calculation of the power and the power amount in the first virtual synchronous inertia control unit 108 also needs to be considered in the time-series power command, or time-series power command unit 408.

The variation in the direct-current voltage at the direct-current capacitor 105 is alleviated by the correction output power command $P_{out}*$ depicted in these FIG. 7A and FIG. 7B.

<Characteristic Comparison of Virtual Synchronous Inertia Control Between Present Invention, or First Embodiment, and Comparative Examples>

Next, characteristics of the virtual synchronous inertia control of the first embodiment of the present invention and the comparative examples will be described with comparison.

There are a first comparative example and a second comparative example as the comparative examples.

The second comparative example is the case in which the mode-corresponding-inertia adjusting unit 306 in FIG. 4 is not included.

The first comparative example is the case in which the mode-corresponding-inertia adjusting unit 306 in FIG. 4 is included.

Next, the first comparative example and the second comparative example of the comparative examples will be sequentially described.

<<Characteristics of Virtual Synchronous Inertia Control in Case in which Mode-Corresponding-Inertia Adjusting Unit is Absent in Second Comparative Example>>

Figure 8:
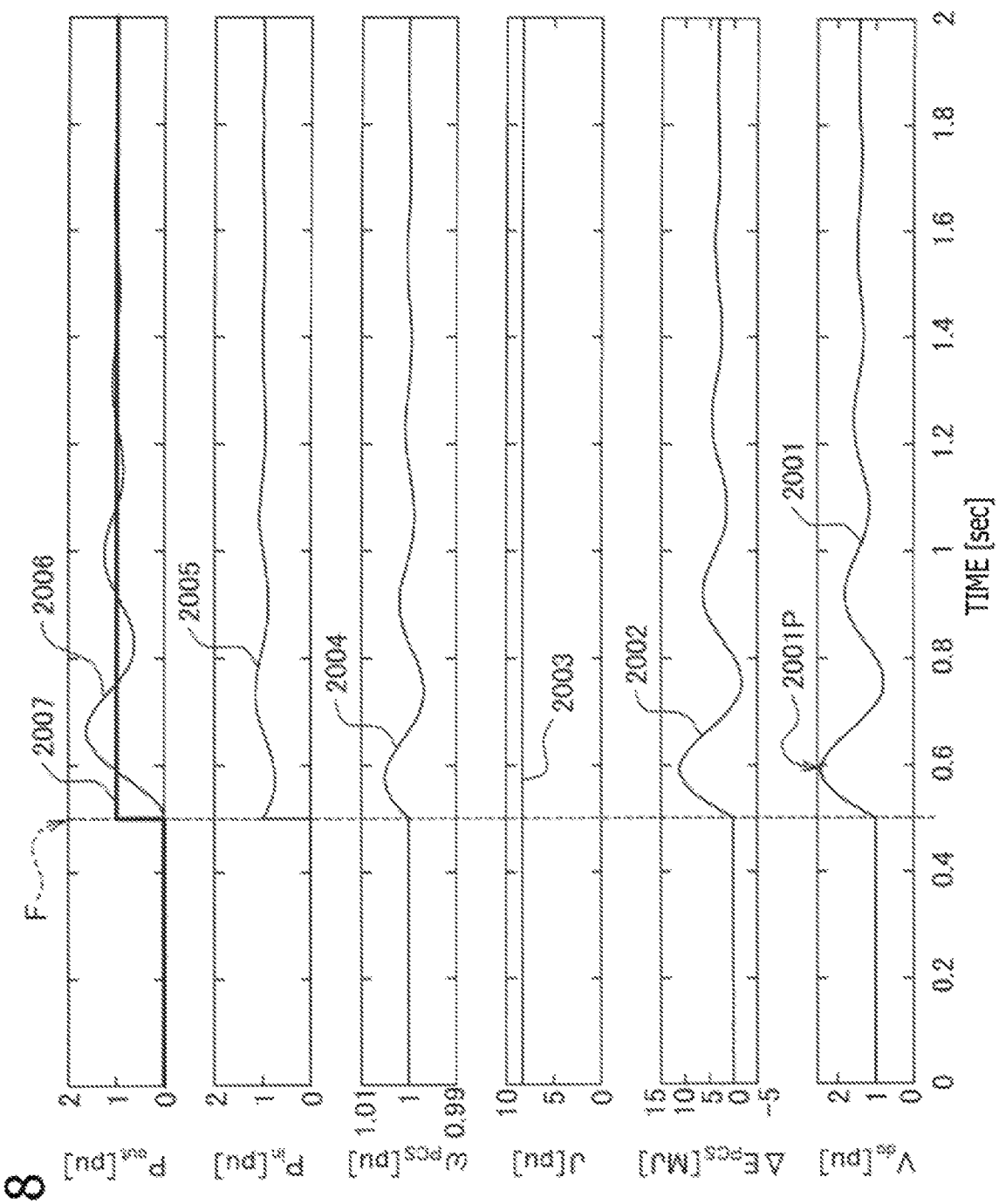
FIG. 8 is a diagram depicting a characteristic example of the second virtual synchronous inertia control unit in a case in which a mode-corresponding-inertia adjusting unit is absent in a second comparative example.

FIG. 8 is a diagram depicting a characteristic example of the second virtual synchronous inertia control unit in the case in which the mode-corresponding-inertia adjusting unit 306 is absent in the second comparative example. Because of the case in which the mode-corresponding-inertia adjusting unit 306 is absent, the time-series power command unit 408 is also not used.

In FIG. 8, on the ordinate axes, the input voltage $V_{dc}$, residual energy $\Delta E_{pcs}$, the moment of inertia J, the angular velocity $\omega_{PCS}$ of the rotor, the input power, or mechanical input, $P_{in}$, and the output power $P_{out}$ are represented.

The respective units on the ordinate axis are all represented by pu "p. u." that is the per unit method regarding the items other than the residual energy $\Delta E_{pcs}$, whose unit is [MJ]. Furthermore, the abscissa axis represents the time, or transition of time.

Because FIG. 8 depicts the case in which the mode-corresponding-inertia adjusting unit is absent in the second comparative example as described above, the moment of inertia J depicted by a characteristic line 2003 always keeps a certain value.

Furthermore, when the power conversion apparatus, or renewable energy resources integrating power conversion apparatus, starts power conversion control after 0.5 seconds depicted by symbol F, the input voltage $V_{dc}$ the residual energy $\Delta E_{pcs}$, the angular velocity $\omega_{PCS}$ of the rotor, the input power, or mechanical input, $P_{in}$, and the output power $P_{out}$ change.

Even when the above-described respective characteristics change after 0.5 seconds, the correction output power command $P_{out}*$ is constant. So, this control is not proper control and therefore the output power $P_{out}$ depicts an oscillation waveform although decreasing as depicted by a characteristic line 2006.

Moreover, by the residual energy $\Delta E_{pcs}$, which is represented by the characteristic line 2002, that varies at the direct-current capacitor 105 of the power conversion apparatus and has become a residual, the input voltage $V_{dc}$ at the direct-current capacitor 105 is varied as represented by the characteristic line 2001.

As above, in the manipulation in the case in which the mode-corresponding-inertia adjusting unit is absent, one second or longer is necessary in order for the control system to suppress the oscillation phenomenon at the output terminal.

Moreover, the voltage of the direct-current capacitor 105 reaches a voltage value of 2.4 [pu], which is 2.4 times the normal value, in the transition period of the variation, see the peak value 2001P of the characteristic line 2001.

If the capacitance of the direct-current capacitor 105 is set higher, the peak value 2001P of the voltage of the direct-current capacitor 105 can be reduced. Furthermore, setting the capacitance of the direct-current capacitor 105 higher suppresses the excessive voltage and provides stable operation.

However, setting the capacitance of the direct-current capacitor 105 higher cause the rise of the cost of the power conversion apparatus.

<<Characteristics of Virtual Synchronous Inertia Control in Case in which Mode-Corresponding-Inertia Adjusting Unit is Present in First Comparative Example>>

Figure 9:
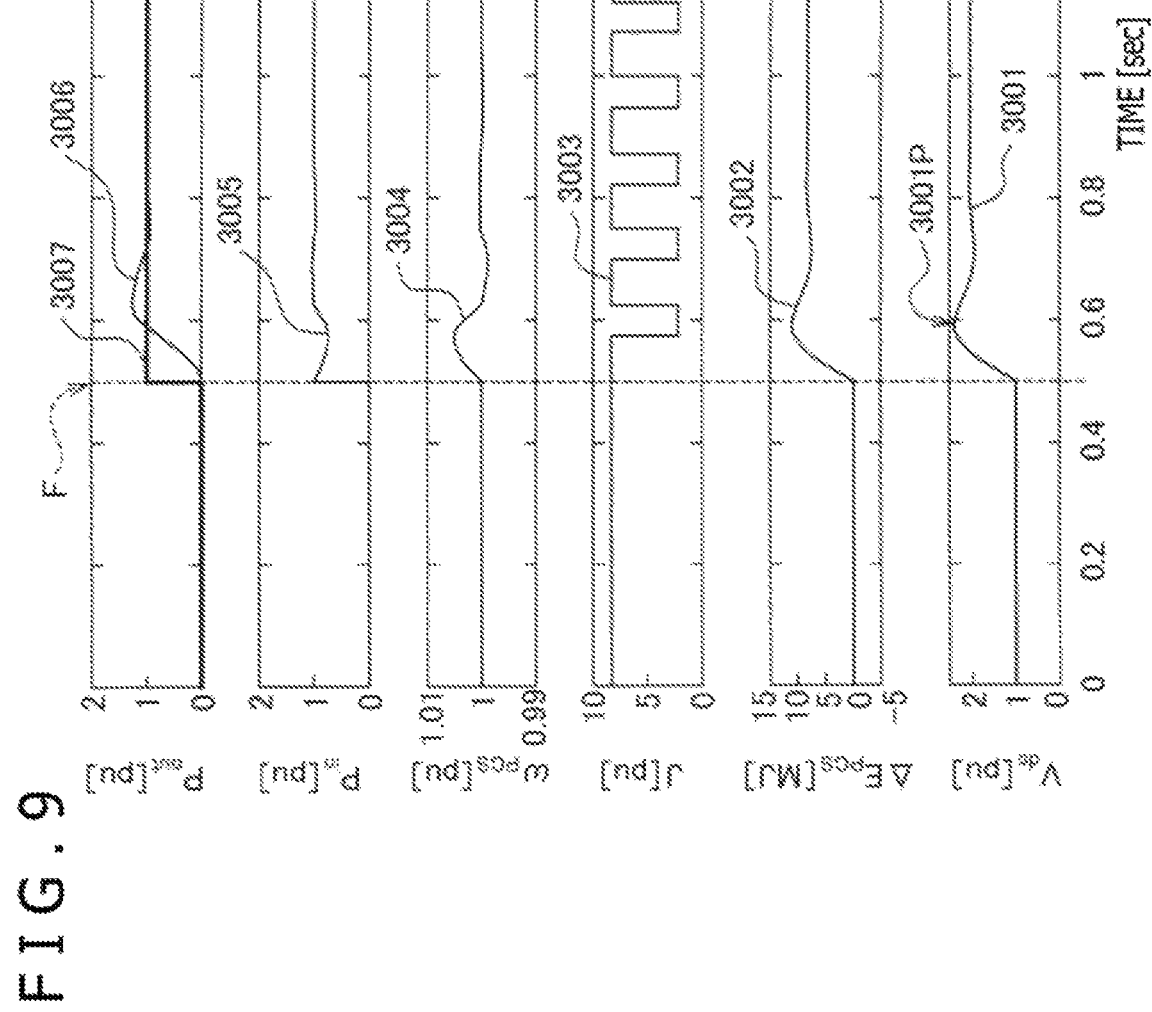
FIG. 9 is a diagram depicting a characteristic example of the second virtual synchronous inertia control unit in a case in which the mode-corresponding-inertia adjusting unit is present in the first comparative example.

FIG. 9 is a diagram depicting a characteristic example of the second virtual synchronous inertia control unit in the case in which the mode-corresponding-inertia adjusting unit 306 is present in the first comparative example. However, although this case is the case in which the mode-corresponding-inertia adjusting unit 306 is present, the time-series power command unit 408, see FIG. 7A, is not used.

In FIG. 9, on the ordinate axes, the input voltage $V_{dc}$ the residual energy $\Delta E_{pcs}$, the moment of inertia J, the angular velocity $\omega_{PCS}$ of the rotor, the input power $P_{in}$, and the output power $P_{out}$ are represented.

The respective units on the ordinate axis are all represented by pu "p. u." that is the per unit method regarding the items other than the residual energy $\Delta E_{pcs}$, whose unit is [MJ]. Furthermore, the abscissa axis represents the time, or transition of time.

In FIG. 9, as described above, because of the case in which the mode-corresponding-inertia adjusting unit 306 is present in the first comparative example, the moment of inertia J changes in the transition period and the subsequent period as represented by the characteristic line 3003.

The characteristics depicted in FIG. 9 in the first comparative example are different from the characteristics depicted in FIG. 8 in the second comparative example. This difference is attributed to difference in the control of the moment of inertia J in the transition period.

The moment of inertia J in FIG. 8, which is represented by the characteristic line 2003, is not controlled but at a constant value, whereas the moment of inertia J in FIG. 9, which is represented by the characteristic line 3003, is finely controlled to change.

As a result of this control of the moment of inertia J in FIG. 9, which is represented by the characteristic line 3003, in contrast to the second comparative example, in which the transient oscillation phenomenon of the output power $P_{out}$ which is represented by the characteristic line 2006 in FIG. 8 at the output terminal continues for a comparatively-long time, the transient phenomenon of the output power $P_{out}$, which is represented by the characteristic line 3006, rapidly damps to converge in the first comparative example as depicted by the characteristic line 3006, see FIG. 9.

However, the peak value in the transient state of the input voltage $V_{dc}$, which is represented by the characteristic line 3001, in FIG. 9 in the first comparative example reaches a voltage value of 2.4 [pu], which is almost the same as the peak value in the transient state of the voltage $V_{dc}$, which is represented by the characteristic line 2001, in FIG. 8 in the second comparative example.

Therefore, as the virtual synchronous power conversion apparatus, in terms of control for suppressing the excessive voltage and providing stable operation, the first comparative example also needs to employ a countermeasure such as setting the capacitance of the direct-current capacitor 105 higher similarly to the second comparative example.

Figure 10:
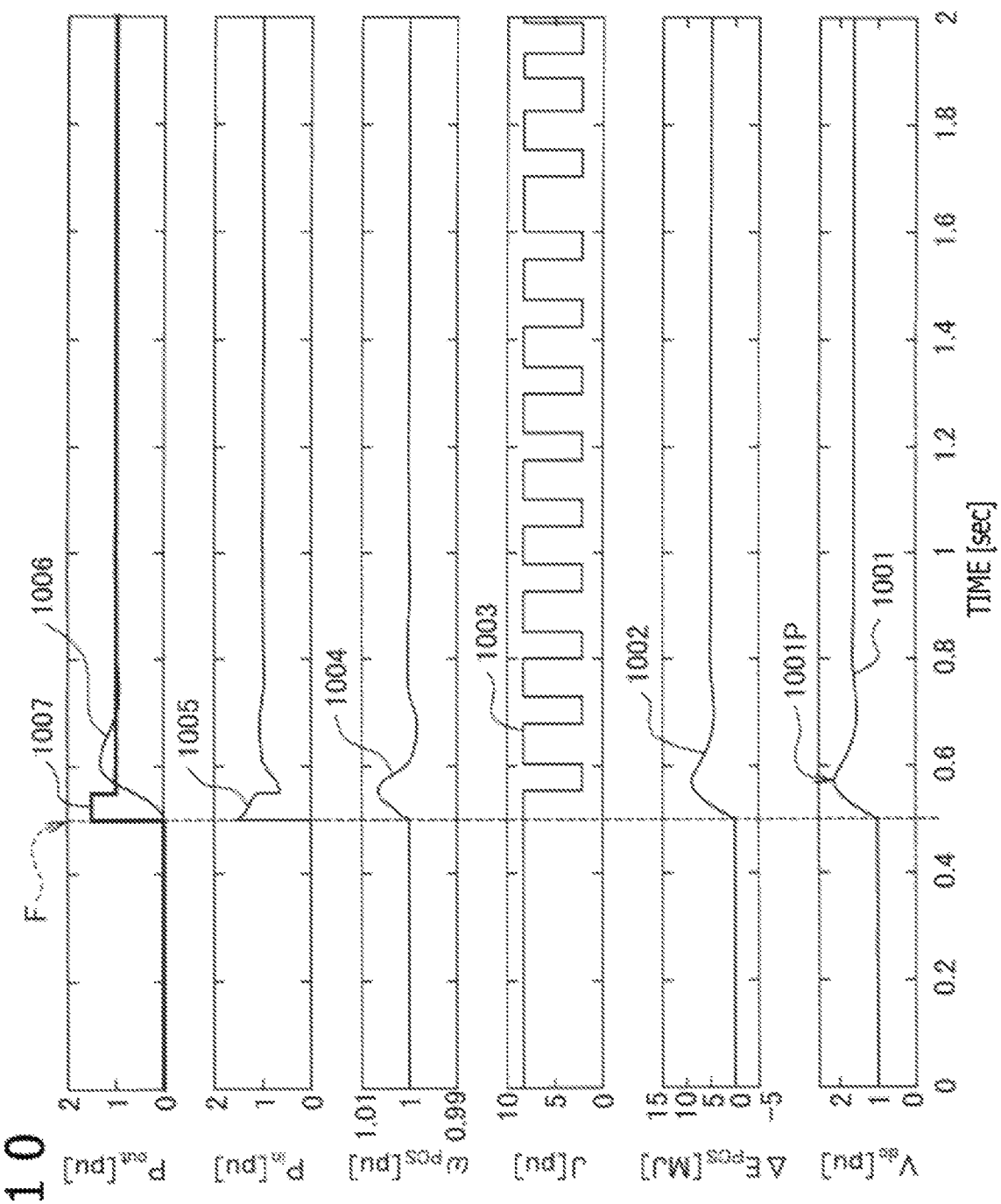
FIG. 10 is a diagram depicting characteristics of virtual synchronous inertia control according to the first embodiment of the present invention.

<<Characteristics of Virtual Synchronous Inertia Control in First Embodiment of Present Invention, FIG. 10>>

FIG. 10 is a diagram depicting a characteristic example in the case in which the first virtual synchronous inertia control unit 108 according to the first embodiment of the present invention is used.

In FIG. 10, on the ordinate axes, the input voltage $V_{dc}$, the residual energy $\Delta E_{pcs}$, the moment of inertia J, the angular velocity $\omega_{PCS}$ of the rotor, the input power $P_{in}$, and the output power $P_{out}$ are represented. Furthermore, in the item of the output power $P_{out}$, the correction output power command $P_{out}^*$, which is represented by the characteristic line 1007, depicted in FIG. 7B is represented in conjunction.

The respective units on the ordinate axis are all represented by pu "p. u." that is the per unit method regarding the items other than the residual energy $\Delta E_{pcs}$, whose unit is [MJ]. Furthermore, the abscissa axis represents the time, or transition of time.

Due to the effect of the correction output power command $P_{out}^*$, which is represented by the characteristic line 1007, in FIG. 10, the peak value 1001P in the transient state of the input voltage $V_{dc}$, which is represented by the characteristic line 1001, in the transient period becomes a voltage value of 2.1 [pu] and decreases with respect to 2.4 [pu] as the peak value in the transient state of the input voltage $V_{dc}$ of the first comparative example and the second comparative example. That the peak value decreases as above is desirable as the power conversion apparatus, or renewable energy resources integrating power conversion apparatus 100.

As the correction output power command $P_{out}^*$, which is represented by the characteristic line 1007, in FIG. 10, the case in which the original output power command $P_{original}^*$ is changed to the positive side on the upper side in FIG. 7B is depicted.

In FIG. 10, the case in which the original output power command $P_{original}^*$ is changed to the negative side on the lower side in FIG. 7B is not depicted. However, although there is the difference between the positive side and the negative side, the action of decreasing the peak value in the transient state of the input voltage $V_{dc}$ is substantially the same. Therefore, overlapping description is omitted.

<Summarization of Configuration, Functions, and Operation of Renewable Energy Resources Integrating Power Conversion Apparatus 100 of First Embodiment>

As described above, the first virtual synchronous inertia control unit 108 includes the second virtual synchronous inertia control unit 110 and the power change deciding unit 111. Furthermore, the second virtual synchronous inertia control unit 110 has a function of controlling the moment of virtual synchronous inertia as described above.

Furthermore, the power change deciding unit 111 has a function of adjusting and controlling the active output power, or active power control, based on the combination with the second virtual synchronous inertia control unit 110.

Moreover, the power change deciding unit 111 has the output power change command unit 407 including the time-series power command unit 408 that defines the response at the time of power change in detail.

By the above configuration, the renewable energy resources integrating power conversion apparatus 100 of the first embodiment transiently alleviates the energy difference, or power difference, between the input and output of the power conversion apparatus 100 when power fluctuation attributed mainly to the renewable energy resources 101 has occurred.

Thus, the voltage of the direct-current capacitor 105 set on the input side of the inverter 104 is kept in a normal manipulation range, or operation range. By this function, the power conversion apparatus 100 based on the virtual synchronous inertia control is protected from sudden variation in the environment regarding the renewable energy resources 101, see FIG. 1, and operation stop is avoided.

Effects of First Embodiment of Present Invention

As above, according to the renewable energy resources integrating power conversion apparatus 100 of the first embodiment of the present invention, even when fluctuation in the power occurs in the renewable energy resources 101, the influence due to the fluctuation can be rapidly reduced and be caused to converge. In other words, there is an effect that high moment of inertia can be equivalently given to the renewable energy resources, or front-end+back-end, through the renewable energy resources integrating power conversion apparatus 100.

Therefore, the power conversion apparatus, or renewable energy resources integrating power conversion apparatus 100, that improves the power quality can be provided for the transmission line network having the renewable energy resources.

Furthermore, the voltage transiently generated in the direct-current capacitor in the renewable energy resources integrating power conversion apparatus 100 can be reduced. Thus, there is an effect that this voltage reduction contributes to improvement in the stable operation and reliability of the renewable energy resources integrating power conversion apparatus 100.

Moreover, the above effects can be implemented without increasing the capacitance of the direct-current capacitor in the renewable energy resources integrating power conversion apparatus 100. Thus, there is an effect that the same effects can be implemented and provided at lower cost compared with a method in which the capacitance of the direct-current capacitor is increased.

Second Embodiment of Present Invention

A renewable energy resources integrating power conversion apparatus 100B according to a second embodiment of the present invention will be described with reference to FIG. 11A and FIG. 11B, FIG. 12 to FIG. 14, and FIG. 15A to FIG. 15C as appropriate.

<<Outline of Renewable Energy Resources Integrating Power Conversion Apparatus 100B of Second Embodiment of Present Invention>>

Figure 11A:
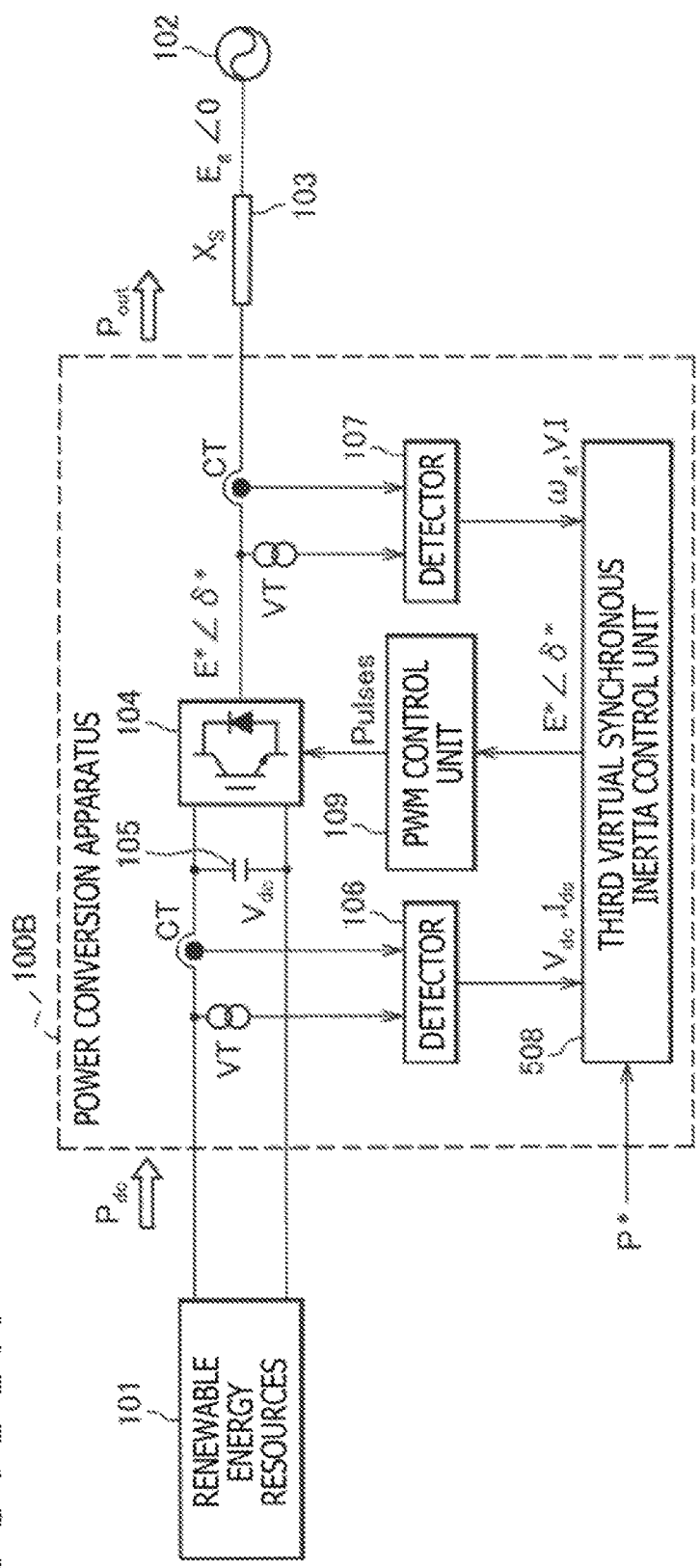
FIG. 11A is a diagram depicting the configuration of a renewable energy resources integrating power conversion apparatus according to a second embodiment of the present invention and a relationship of connection to the renewable energy resources and a three-phase alternating-current power supply.
Figure 11B:
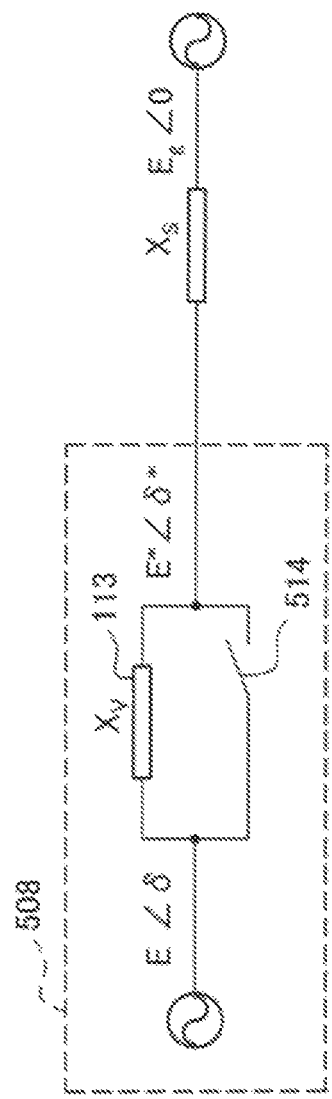
FIG. 11B is a diagram depicting an equivalent circuit of a third virtual synchronous inertia control unit of the renewable energy resources integrating power conversion apparatus according to the second embodiment of the present invention.

FIG. 11A and FIG. 11B are diagrams depicting one example of the configuration of the renewable energy resources integrating power conversion apparatus, or power conversion apparatus, 100B according to the second embodiment of the present invention.

FIG. 11A is a diagram depicting the configuration of the renewable energy resources integrating power conversion apparatus 100B according to the second embodiment of the present invention and the relationship of connection to the renewable energy resources 101 and the three-phase alternating-current power supply 102.

FIG. 11B is a diagram depicting an equivalent circuit of a third virtual synchronous inertia control unit 508 of the renewable energy resources integrating power conversion apparatus 100B according to the second embodiment of the present invention.

In FIG. 11A, the renewable energy resources integrating power conversion apparatus, or power conversion apparatus, 100B includes the inverter 104, the direct-current capacitor 105, the detectors, or voltage-current detectors, 106 and 107, the third virtual synchronous inertia control unit 508, and the PWM control unit 109.

Furthermore, to the renewable energy resources integrating power conversion apparatus 100B, power of the active input power $P_{dc}$ is input from the renewable energy resources 101 that are the front-end of the renewable energy resources typified by solar-generated power, wind-generated power, and so forth.

In the above, the difference between the renewable energy resources integrating power conversion apparatus 100B according to the second embodiment depicted in FIG. 11A and the renewable energy resources integrating power conversion apparatus 100 according to the first embodiment depicted in FIG. 1 is only the difference between the third virtual synchronous inertia control unit 508 in FIG. 11A and the first virtual synchronous inertia control unit 108 in FIG. 1. Therefore, other overlapping description is omitted as appropriate.

The third virtual synchronous inertia control unit 508 in FIG. 11A will be described in detail after explanation of FIG. 11B.

FIG. 11B depicts the equivalent circuit of the third virtual synchronous inertia control unit 508 as described above.

In FIG. 11B, it is represented that, as described later, the third virtual synchronous inertia control unit 508 selects, by a switching unit 514, whether to use a virtual impedance value $X_V$ generated by a virtual impedance value deciding unit 512, see FIG. 12, and a virtual impedance control unit 513, see FIG. 12, or not "0" based on the flag signal F that is a command of power change to be described later.

Next, the third virtual synchronous inertia control unit 508 will be described.

<<Third Virtual Synchronous Inertia Control Unit 508 in Second Embodiment of Present Invention>>

Figure 12:
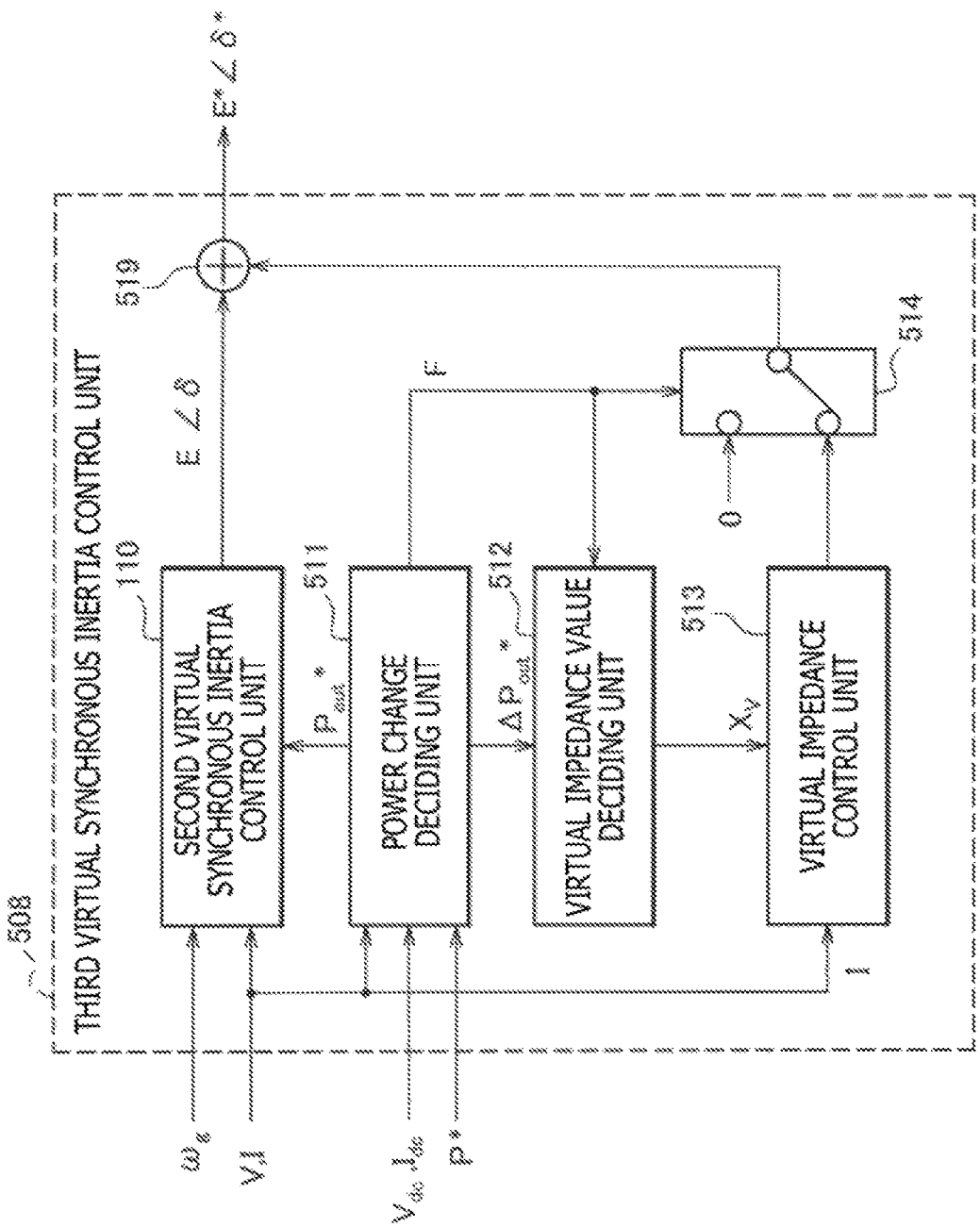
FIG. 12 is a diagram depicting one example of the configuration of the third virtual synchronous inertia control unit in the renewable energy resources integrating power conversion apparatus according to the second embodiment of the present invention.

FIG. 12 is a diagram depicting one example of the configuration of the third virtual synchronous inertia control unit 508 in the renewable energy resources integrating power conversion apparatus 100B according to the second embodiment of the present invention.

In FIG. 12, the third virtual synchronous inertia control unit 508 is configured to include the second virtual synchronous inertia control unit 110, a power change deciding unit 511, the virtual impedance value deciding unit 512, the virtual impedance control unit 513, the switching unit 514, and a synthesizing unit, or adder, 519.

To the third virtual synchronous inertia control unit 508, the voltage V, the current I, and the output frequency $\omega_g$ on the output side of the inverter 104, the voltage $V_{dc}$ and the current $I_{dc}$ on the input side of the inverter 104, and the output power command P* are input. Then, the third virtual synchronous inertia control unit 508 outputs the reference command E*∠δ*.

Based on the above-described input signals and command "$V_{dc}$, $I_{dc}$, V, I, P*," the power change deciding unit 511 generates the correction output power command $P_{out}$*, a signal $\Delta P_{out}$* of the change amount, or difference, thereof, and the flag signal F that transmits decision of change of the power command.

Then, the power change deciding unit 511 supplies the above-described correction output power command $P_{out}$* to the second virtual synchronous inertia control unit 110 and supplies the signal $\Delta P_{out}^*$ of the change amount, or difference, of the above-described correction output power command $P_{out}^*$ to the virtual impedance value deciding unit 512.

Furthermore, the power change deciding unit 511 supplies the flag signal F to the virtual impedance value deciding unit 512 and the switching unit 514.

The second virtual synchronous inertia control unit 110 carries out control with the voltage V, the current I, and the output frequency $\omega_g$ on the output side of the inverter 104, see FIG. 11A, and the above-described correction output power command $P_{out}^*$ and outputs a provisional reference command signal $E\angle\delta$ that is a provisional reference command.

The virtual impedance value deciding unit 512 calculates the virtual impedance value $X_V$ by the signal $\Delta P_{out}^*$ of the change amount, or difference, of the correction output power command and the flag signal F.

The virtual impedance control unit 513 derives a correction reference command by using the current I on the output side and the virtual impedance value $X_V$. Specifically, the virtual impedance control unit 513 sends, to a second input terminal of the switching unit 514, a signal obtained through changing the phase of the current I by −90 degrees "−π/2" and carrying out amplification, or buffer, with reference to the virtual impedance value $X_V$ as the correction reference command.

The switching unit 514 selects the correction reference command of the second input terminal or "0," or without change, of a first input terminal by the flag signal F and inputs an output signal thereof to a second terminal of the synthesizing unit, or adder, 519. If the flag signal F is set, the correction reference command output by the virtual impedance control unit 513 is selected.

To a first terminal of the synthesizing unit, or adder, 519, the provisional reference command $E\angle\delta$ that is the output of the second virtual synchronous inertia control unit 110 is input.

The synthesizing unit, or adder, 519 synthesizes or adds the correction reference command relating to control of the virtual impedance value of the switching unit 514 and the provisional reference command signal $E\angle\delta$ as the output of the second virtual synchronous inertia control unit 110 and outputs the reference command $E^*\angle\delta^*$.

By the above configuration, adjustment of the virtual output impedance is further improved. Specifically, when the power conversion apparatus, or renewable energy resources integrating power conversion apparatus 100B, carries out operation or manipulation of power adjustment change, large deviation of the direct-current voltage at the direct-current capacitor 105, see FIG. 11A, can be avoided by temporarily inserting the virtual impedance control.

The second virtual synchronous inertia control unit 110 is as described above in FIG. 3 depicting the first embodiment and FIG. 4 depicting the first comparative example.

Details of each of the power change deciding unit 511 and the virtual impedance value deciding unit 512 will be described later.

<<Power Change Deciding Unit 511 in Second Embodiment of Present Invention>>

Next, a detailed description will be made about the power change deciding unit 511, which is a characteristic constituent element of the second embodiment of the present invention.

Figure 13:
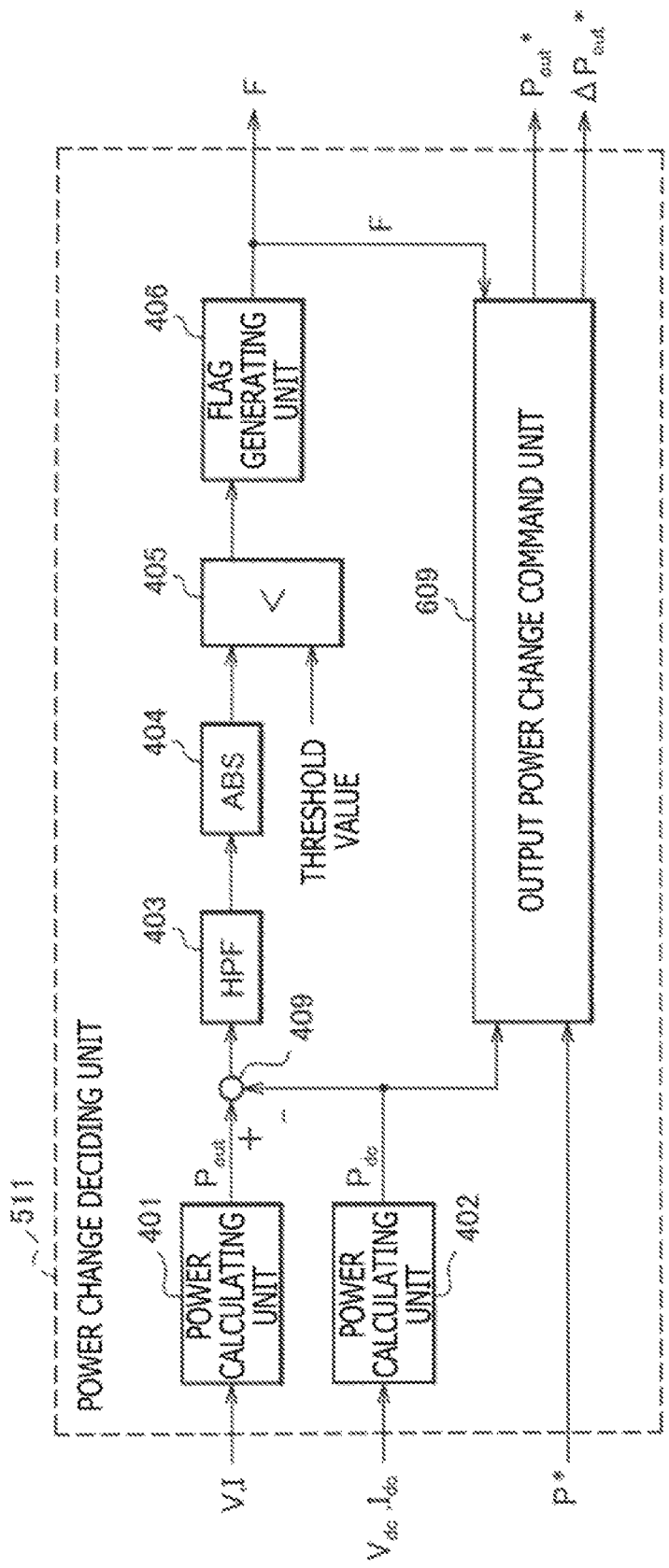
FIG. 13 is a diagram depicting one example of the configuration of a power change deciding unit in the renewable energy resources integrating power conversion apparatus according to the second embodiment of the present invention.

FIG. 13 is a diagram depicting one example of the configuration of the power change deciding unit 511 in the renewable energy resources integrating power conversion apparatus 100B according to the second embodiment of the present invention.

In FIG. 13, the power change deciding unit 511 is configured to include the power calculating units 401 and 402, the HPF 403, the absolute value calculating unit, or ABS, 404, the threshold value comparing-determining unit 405, the flag generating unit 406, and an output power change command unit 609.

In the above configuration of the power change deciding unit 511 depicted in FIG. 13, the difference from the power change deciding unit 111 depicted in FIG. 6 is the output power change command unit 609. Detailed configuration and operation of the output power change command unit 609 will be described later. Due to the inclusion of the output power change command unit 609 in the power change deciding unit 511, not only the correction output power command $P_{out}^*$ but also the signal $\Delta P_{out}^*$ of the change amount, or difference, of the correction output power command $P_{out}^*$ is output from the power change deciding unit 511.

The other configurations in FIG. 13 are the same as the respective configurations given the same numerals in FIG. 6 and therefore overlapping description is omitted.

<<Output Power Change Command Unit 609 in Second Embodiment of Present Invention>>

Next, the output power change command unit 609 will be described in detail.

Figure 14:
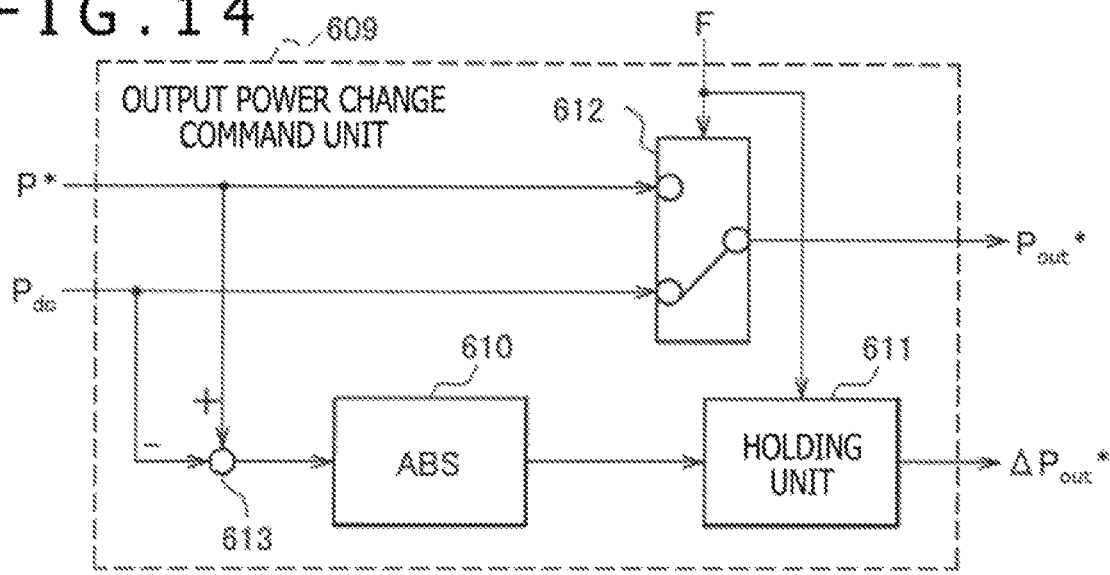
FIG. 14 is a diagram depicting one example of the configuration of an output power change command unit in the renewable energy resources integrating power conversion apparatus according to the second embodiment of the present invention.

FIG. 14 is a diagram depicting one example of the configuration of the output power change command unit 609 in the renewable energy resources integrating power conversion apparatus 100B according to the second embodiment of the present invention.

In FIG. 14, the output power change command unit 609 is configured to include an absolute value calculating unit, or ABS, 610, a holding unit 611, a switching unit 612, and a difference unit, or subtractor, 613.

To the output power change command unit 609, the active input power $P_{dc}$ from the renewable energy resources 101, the output power command P*, and the flag signal F of the flag generating unit 406 are input.

Furthermore, the output power change command unit 609 outputs the correction output power command $P_{out}^*$ and the signal $\Delta P_{out}^*$ of the change amount, or difference, of the correction output power command.

The output power command P* and the active input power $P_{dc}$ are each input to the difference unit 613 and the difference between the output power command P* and the active input power $P_{dc}$ is output. A signal of this difference is input to the absolute value calculating unit, or ABS, 610.

The absolute value calculating unit, or ABS, 610 calculates the absolute value of the difference between the output power command P* and the active input power $P_{dc}$ and inputs the absolute value to the holding unit 611.

The output power command P* is input to a first terminal of the switching unit 612 and the active input power $P_{dc}$ is input to a second terminal.

Switching of the signal in the switching unit 612 is controlled by the flag signal F. If the flag signal F that is the command of power change is not set, the output power command P* is output as the correction output power command $P_{out}^*$ of the switching unit 612.

If the flag signal F that is the command of power change is set in the switching unit 612, the active input power $P_{dc}$ is output as the correction output power command $P_{out}^*$ of the switching unit 612.

Furthermore, if the flag signal F that is the command of power change is set, based on this flag signal F, the holding unit 611 holds the signal of the absolute value calculating unit, or ABS, 610 and outputs it as the signal $\Delta P_{out}^*$ of the change amount, or difference, of the correction output power command.

By the above configuration, when manipulation based on the command of power change starts and the flag signal F is set, the correction output power command $P_{out}^*$ is adjusted to match not the output power command P*, which is used in normal manipulation, but the active input power $P_{dc}$. The purpose thereof is to prevent the voltage of the direct-current capacitor 105, see FIG. 11A, from becoming unstable due to the active power that has become imbalanced between the input and output.

As above, by changing the correction output power command $P_{out}^*$, the situation of the active power that has become imbalanced from the stable state is solved.

However, in the process of manipulation of changing the power command, it is not ensured that the voltage of the direct-current capacitor 105, see FIG. 11A, can withstand large divergence of the direct-current voltage.

The method in which the virtual impedance is used with the configuration of the output power change command unit 609 in the second embodiment carries out adjustment to alleviate deviation of the transient voltage of the direct-current capacitor 105 from the stable state.

In order to decide the virtual impedance value in the process of manipulation of changing the power command, by reading the absolute value of the difference between the output power command P* and the active input power $P_{dc}$, the total amount by which the signal $\Delta P_{out}^*$ of the change amount, or difference, of the correction output power command is changed from the start of manipulation based on the command of power change is detected.

<<Characteristics and Operation of Virtual Impedance Value Deciding Unit 512 in Second Embodiment of Present Invention>>

Next, characteristics and operation of the virtual impedance value deciding unit 512, see FIG. 12 and FIG. 15A, in the second embodiment of the present invention will be described in detail.

Figure 15A:
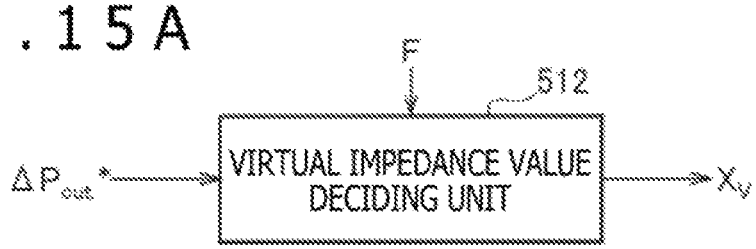
FIG. 15A is a diagram depicting input signal, output signal, and control signal of a virtual impedance value deciding unit in the second embodiment of the present invention.
Figure 15B:
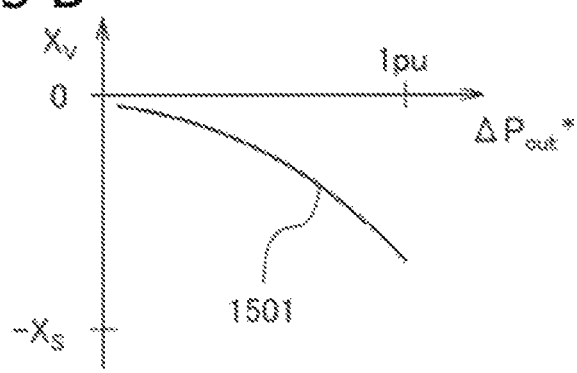
FIG. 15B is a conversion diagram depicting the relationship between the input signal and the output signal of the virtual impedance value deciding unit in the second embodiment of the present invention.
Figure 15C:
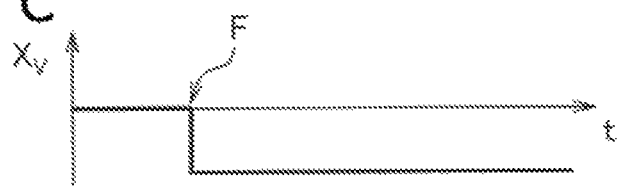
FIG. 15C is a diagram depicting time change of the output signal of the virtual impedance value deciding unit in the second embodiment of the present invention.

FIG. 15A, FIG. 15B, and FIG. 15C are diagrams depicting one example of the characteristics and operation of the virtual impedance value deciding unit 512 in the second embodiment of the present invention.

FIG. 15A is a diagram depicting input signal, output signal, and control signal of the virtual impedance value deciding unit 512 in the second embodiment of the present invention.

FIG. 15B is a conversion diagram, or map, depicting the relationship between the input signal and the output signal of the virtual impedance value deciding unit 512 in the second embodiment of the present invention.

FIG. 15C is a diagram depicting time change of the virtual impedance value $X_V$ of the virtual impedance value deciding unit 512 in the second embodiment of the present invention.

In FIG. 15A, when the flag signal F of the command of power change as the control signal is set, the virtual impedance value deciding unit 512 starts operation and converts the signal $\Delta P_{out}^*$ of the change amount, or difference, of the correction output power command as the input signal to the virtual impedance value $X_V$ as the output signal to output the virtual impedance value $X_V$.

In FIG. 15B, the relationship between the signal $\Delta P_{out}^*$ of the change amount, or difference, of the correction output power command depicted on the abscissa axis and the virtual impedance value $X_V$ depicted on the ordinate axis is represented by a characteristic line 1501. Furthermore, a point represented as "$-X_S$" on the ordinate axis in FIG. 15B represents the impedance value of the impedance $X_S$ 103 as the grid of the three-phase alternating-current power supply 102 in FIG. 1.

Furthermore, in FIG. 15C, the ordinate axis represents the virtual impedance value $X_V$ and the abscissa axis represents the time, or transition of time. In FIG. 15C, time change of the virtual impedance value $X_V$ when the flag signal F that is the control signal and is the command of power change changes is depicted.

As above, in the state in which the flag signal F of the command of power change is effective, the virtual impedance value $X_V$ is figured out through being converted from the signal $\Delta P_{out}^*$ of the change amount, or difference, of the correction output power command in accordance with the conversion diagram, or map.

The virtual impedance value $X_V$ described with FIG. 15A, FIG. 15B, and FIG. 15C is input to the second input terminal of the switching unit 514 in FIG. 12 as the correction reference command.

In other words, if the flag signal F is set, the provisional reference command E∠δ is corrected to the reference command E*∠δ* by the correction reference command based on the virtual impedance value $X_V$ in FIG. 12.

Figure 16:
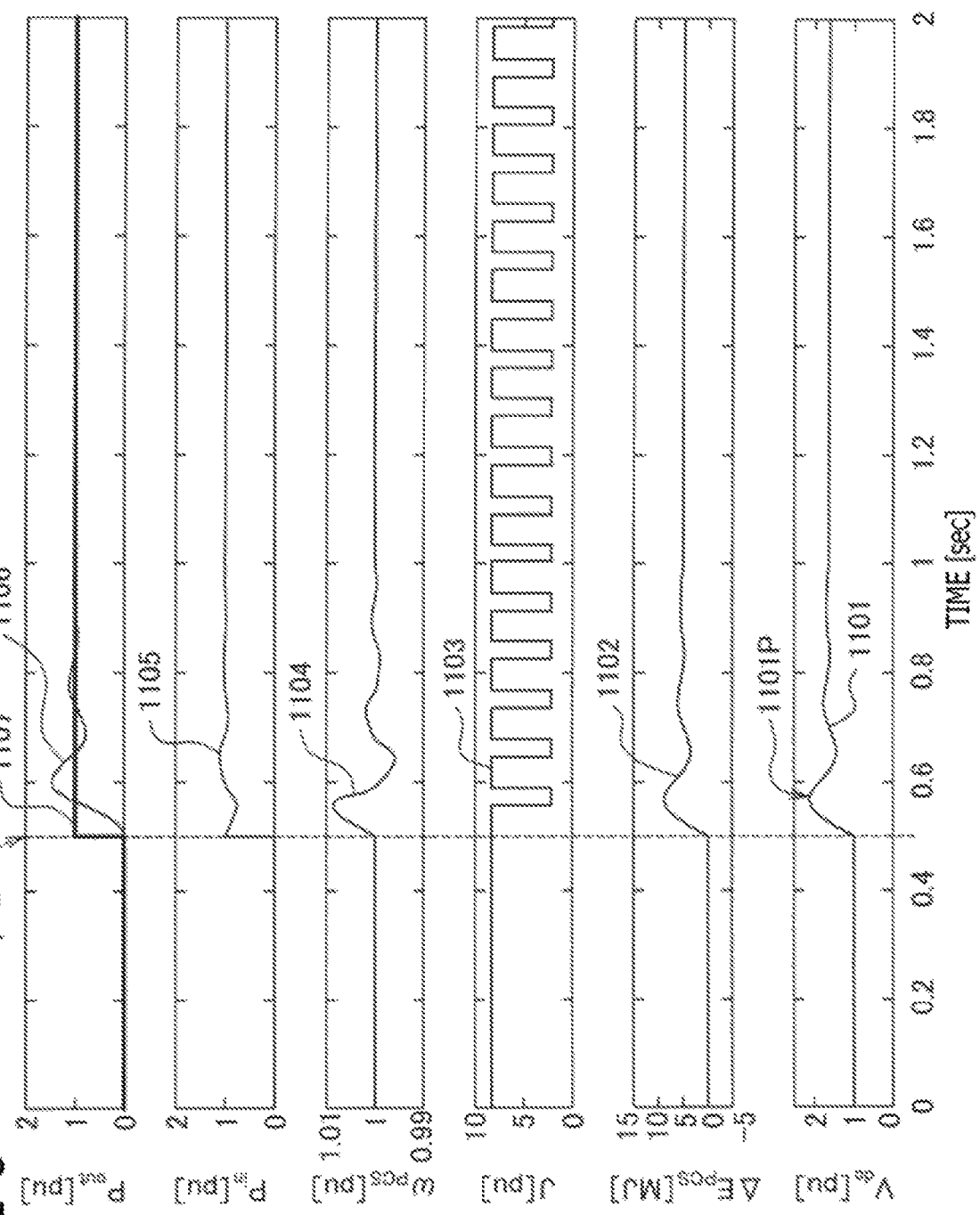
FIG. 16 is a diagram depicting a characteristic example in the case in which the third virtual synchronous inertia control according to the second embodiment of the present invention is used.

<<Characteristics of Third Virtual Synchronous Inertia Control in Second Embodiment of Present Invention, FIG. 16>>

FIG. 16 is a diagram depicting a characteristic example in the case in which the third virtual synchronous inertia control unit 508 according to the second embodiment of the present invention is used.

In FIG. 16, on the ordinate axes, the input voltage $V_{dc}$ the residual energy $\Delta E_{pcs}$, the moment of inertia J, the angular velocity $\omega_{PCS}$ of the rotor, the input power $P_{in}$, and the output power $P_{out}$ are represented. Furthermore, in the item of the output power $P_{out}$, the correction output power command $P_{out}^*$ is represented in conjunction.

The respective units on the ordinate axis are all represented by pu "p. u." that is the per unit method regarding the items other than the residual energy $\Delta E_{pcs}$, whose unit is [MJ]. Furthermore, the abscissa axis represents the time, or transition of time.

In FIG. 16, based on the flag signal F, the power conversion apparatus, or renewable energy resources integrating power conversion apparatus 100B, starts power conversion operation or manipulation after 0.5 seconds. Thus, the correction output power command $P_{out}^*$, which is represented by the characteristic line 1107, immediately changes.

At this time, an oscillation phenomenon is occurring in the output power $P_{out}$, which is represented by the characteristic line 1106, of the power conversion apparatus. However, this oscillation phenomenon rapidly damps. The reason for this is because the moment of inertia J, which is represented by the characteristic line 1103, is changed.

Moreover, in addition to this, the reason is because the virtual impedance $X_V$ of the output terminal is inserted and the residual energy $\Delta E_{pcs}$, which is represented by the characteristic line 1102 in FIG. 16, of the direct-current capacitor 105, see FIG. 11, of the power conversion apparatus is suppressed.

For this reason, this residual energy $\Delta E_{pcs}$, which is represented by the characteristic line 1102 in FIG. 16, is lower compared with the residual energy $\Delta E_{pcs}$ in FIG. 8, which is represented by the characteristic line 2002: of the second comparative example, and the residual energy $\Delta E_{pcs}$ in FIG. 9, which is represented by the characteristic line 3002 of the first comparative example.

As a result, the deviating peak value 1101P, about 2.1 pu, of the input voltage $V_{dc}$, which is represented by the characteristic line 1101 in FIG. 16, of the direct-current capacitor 105 of the power conversion apparatus, or renewable energy resources integrating power conversion apparatus 100B, is smaller than the deviating peak value 2001P, about 2.4 pu, of the input voltage $V_{dc}$ of the direct-current capacitor 105 of the power conversion apparatus in FIG. 8, which is represented by the characteristic line 2001 of the second comparative example, and the deviating peak value 3001P "about 2.4 pu" of the input voltage $V_{dc}$ of the direct-current capacitor 105 of the power conversion apparatus in FIG. 9, which is represented by the characteristic line 3001 of the first comparative example.

In other words, from 2.4 pu of the peak value in FIG. 8 of the second comparative example and FIG. 9 of the first comparative example, improvement to 2.1 pu is obtained in the peak value depicted in FIG. 16 in the second embodiment of the present invention.

<Summarization of Configuration, Functions, and Operation of Renewable Energy Resources Integrating Power Conversion Apparatus 100B of Second Embodiment>

As described above, the third virtual synchronous inertia control unit 508 includes the second virtual synchronous inertia control unit 110, the power change deciding unit 511, the virtual impedance value deciding unit 512, and the virtual impedance control unit 513. Furthermore, the second virtual synchronous inertia control unit 110 has a function of controlling the moment of virtual synchronous inertia as described above.

Moreover, the power change deciding unit 511 has a function of adjusting and controlling the active power between the input power and the output power, or active power control, based on the combination with the second virtual synchronous inertia control unit 110.

In addition, the power change deciding unit 511 has the output power change command unit 609 from which the output power command P* of manipulation in the normal state, the active input power $P_{dc}$ as the correction output power command $P_{out}*$ when the flag signal F is the command of power change is set, and the signal $\Delta P_{out}*$ of the change amount of the correction output power command are output.

The virtual impedance value deciding unit 512 calculates the virtual impedance value $X_V$ by the signal $\Delta P_{out}*$ of the change amount of the correction output power command and the flag signal F as described above.

The virtual impedance control unit 513 derives the correction reference command by using the current I on the output side and the virtual impedance value $X_V$ as described above.

As described above, the switching unit 514 selects the correction reference command of the second input terminal or "0," or without change, of the first input terminal by the flag signal F and inputs the output signal thereof to the second terminal of the synthesizing unit, or adder, 519.

As described above, the synthesizing unit, or adder, 519 synthesizes or adds the correction reference command relating to control of the virtual impedance value of the switching unit 514 and the provisional reference command signal $E\angle\delta$ as the output of the second virtual synchronous inertia control unit 110 and outputs the reference command $E*\angle\delta*$. If "0" that means "without correction" is selected in the switching unit 514, the provisional reference command signal $E\angle\delta$ is output as the reference command $E*\angle\delta*$ directly.

By the above configuration, when power fluctuation attributed mainly to the renewable energy resources 101 has occurred, the renewable energy resources integrating power conversion apparatus 100B of the second embodiment can avoid large deviation of the direct-current voltage at the direct-current capacitor 105, see FIG. 11A, by temporarily inserting the virtual impedance control when carrying out operation or manipulation of power adjustment change.

Thus, the voltage of the direct-current capacitor 105 set on the input side of the inverter 104 is kept in a normal manipulation range, or operation range. By this function, the power conversion apparatus 100B based on the third virtual synchronous inertia control and the active power control is protected from sudden variation in the environment regarding the renewable energy resources 101, see FIG. 11A, and operation stop is avoided.

Effects of Second Embodiment of Present Invention

As above, according to the renewable energy resources integrating power conversion apparatus 100B of the second embodiment of the present invention, even when fluctuation in the power occurs in the renewable energy resources 101, the influence due to the fluctuation can be rapidly reduced and be caused to converge. In other words, there is an effect that high moment of inertia can be equivalently given to the renewable energy resources, or front-end+back-end, through the renewable energy resources integrating power conversion apparatus 100B.

Therefore, the renewable energy resources integrating power conversion apparatus 100B that improves the power quality can be provided for the transmission line network having the renewable energy resources.

Furthermore, the voltage transiently generated in the direct-current capacitor 105 in the renewable energy resources integrating power conversion apparatus 100B can be reduced. Thus, there is an effect that this voltage reduction contributes to improvement in the stable operation and reliability of the renewable energy resources integrating power conversion apparatus 100B.

Moreover, the above effects can be implemented without increasing the capacitance of the direct-current capacitor in the renewable energy resources integrating power conversion apparatus 100B. Thus, there is an effect that the same effects can be implemented and provided at lower cost compared with a method in which the capacitance of the direct-current capacitor is increased.

Other Embodiments

The present invention is not limited to the embodiments described above and various modification examples are further included therein. For example, the above-described embodiments are what are explained in detail in order to explain the present invention in an easy-to-understand manner and are not necessarily limited to what include all configurations explained. Furthermore, it is possible to replace part of the configuration of a certain embodiment by part of the configuration of another embodiment. Moreover, it is also possible to carry out addition, deletion, and substitution of part or all of the configuration of a certain embodiment for the configuration of another embodiment.

In the following, a further description will be made about other embodiments and modification examples.

<<Method Other than Method for Three-Phase Power>>

In the example of the first embodiment depicted in FIG. 1 and FIG. 2, the case of three-phase alternating-current power is described. However, the present invention can be applied also to the case in which conversion to single-phase alternating-current power is carried out.

<<Switching Unit>>

In FIG. 2, the switching devices 201 to 206 are described as IGBT. However, the configuration is not limited thereto. The switching devices may be a metal-oxide-semiconductor-field-effect-transistor (MOSFET), super-junction MOSFET, or the like.

<<Inverter>>

In FIG. 1, the inverter 104 and the PWM control unit 109 are separately represented. However, the PWM control unit 109 may be configured to be included in the inverter as one part configuring the inverter.

<<First Virtual Synchronous Inertia Control Unit>>

In FIG. 1, the first virtual synchronous inertia control unit 108 is represented as one functional block. However, the second virtual synchronous inertia control unit 110 and the power change deciding unit 111 may be configured to be included as separate functional blocks as depicted in FIG. 3.

<<Detector, Detecting Unit>>

In FIG. 1 and FIG. 11A, the detector, or first detecting unit, 106 that detects the voltage and current on the input side of the inverter 104 and the detector, or second detecting unit, 107 that detects the voltage and current on the output side of the inverter 104 are depicted and explained separately from each other. However, because it suffices to detect the voltage and current on each of the input side and the output side of the inverter 104, the present invention is not limited to the configuration with the two detectors 106 and 107.

The detectors 106 and 107 may be integrated. Furthermore, the detectors 106 and 107 may be each divided into a voltage detector and a current detector and a configuration may be made with four or more detectors.

<<Output Power Change Command Unit>>

In FIG. 7A, the example in which the output power change command unit 407 is configured to include the time-series power command unit 408, the switching unit 410, and the gate unit 411 is depicted. However, it suffices to switch the time-series power command of the time-series power command unit 408 and the output power command P* by the flag signal F. Thus, the output power change command unit 407 is not limited to this circuit.

For example, a circuit configuration obtained by removing the gate unit 411 is also available.

<<Virtual Impedance Value Deciding Unit>>

In FIG. 15A, the virtual impedance value deciding unit 512 calculates the virtual impedance value $X_V$ by one conversion map based on the relationship between the signal $\Delta P_{out}^*$ of the change amount, or difference, of the correction output power command and the virtual impedance value $X_V$ depicted in FIG. 15B. However, the conversion map is not limited to one. There is a possibility that the characteristic, which is represented by the characteristic line 1501, of the conversion map changes due to various conditions.

Therefore, there is also a method in which plural conversion maps are set and are switched based on change in conditions.

What is claimed is:

1. A Renewable energy resources integrating power conversion apparatus comprising:
an inverter that converts generated power of renewable energy resources to predetermined alternating-current power and outputs the alternating-current power to a power transmission network;
a pulse width modulation control unit that controls the inverter;
a first detecting unit that detects a voltage and a current of input to the inverter;
a second detecting unit that detects a voltage, a current, and a frequency of output of the inverter;
a power change deciding unit that calculates input power of an input side of the inverter, output power of an output side of the inverter, and a difference between the input power and the output power from the voltage and the current of each of the input and the output detected by the first and second detecting units, and calculates a correction output power command with reference to an output power command; and
a virtual synchronous inertia control unit that calculates a virtual inertia characteristic based on the voltage, the current, and the frequency of the output detected by the second detecting unit and on the correction output power command, and outputs a reference command to the pulse width modulation control unit, wherein
a response time of the power change deciding unit with respect to change in the input power changes according to a total amount of change in the input power.

2. The renewable energy resources integrating power conversion apparatus according to claim 1, wherein the power change deciding unit includes a first power calculating unit that calculates the output power from the voltage and the current of the output of the inverter, a second power calculating unit that calculates the input power from the voltage and the current of the input to the inverter, a comparing-determining unit that determines whether or not an absolute value of a difference between the output power calculated by the first power calculating unit and the input power calculated by the second power calculating unit exceeds a threshold value defined in advance, a flag generating unit that outputs a flag signal comparing-determining unit determines that the absolute value of the difference between the output power and the input power exceeds the threshold value, and an output power change command unit that outputs the correction output power command based on the input power and the output power command when the flag signal is output.

3. The renewable energy resources integrating power conversion apparatus according to claim 2, wherein
the output power change command unit includes
a time-series power command unit configured based on a scheduled power command, and
a switching unit that has a first terminal to which the output power command is input and a second terminal to which a command output by the time-series power command unit is input, and selects the command of the second terminal or the first terminal by the flag signal to output the command as the correction output power command.

4. The renewable energy resources integrating power conversion apparatus according to claim 3, wherein
the scheduled power command of the time-series power command unit is decided according to a dynamic response time of the renewable energy resources integrating power conversion apparatus and a time of calculation of power.

5. The renewable energy resources integrating power conversion apparatus according to claim 2, wherein the power change deciding unit includes a high-pass filter at a previous stage of calculation of the absolute value of the difference between the output power and the input power.

6. The renewable energy resources integrating power conversion apparatus according to claim 1, wherein
the inverter is a three-phase inverter that converts direct-current power to three-phase alternating-current power.

7. The renewable energy resources integrating power conversion apparatus according to claim 1, wherein
the first detecting unit and the second detecting unit are integrated to be configured as one detecting unit.

8. A renewable energy resources integrating power conversion apparatus comprising: an inverter that converts generated power of renewable energy resources to predetermined alternating-current power and outputs the alternating-current power to a power transmission network; a pulse width modulation control unit that controls the inverter; a first detecting unit that detects a voltage and a current of input to the inverter; a second detecting unit that detects a voltage, a current, and a frequency of output of the inverter; a power change deciding unit that calculates and outputs a correction output power command based on the voltage and the current of each of the input and the output detected by the first and second detecting units and on an output power command, and outputs a signal of change amount of the correction output power command and a flag signal that transmits decision of change of a power command; a virtual synchronous inertia control unit that calculates a virtual inertia characteristic based on the voltage, the current, and the frequency of the output detected by the second detecting unit and on the correction output power command and outputs a provisional reference command; a virtual impedance value deciding unit that calculates a virtual impedance value based on the signal of change amount of the correction output power command and the flag signal; and a virtual impedance control unit that derives a correction reference command based on the current of the output and the virtual impedance value, wherein the provisional reference command and the correction reference command are synthesized to generate a reference command when the correction reference command is selected by the flag signal, and the reference command is generated by the provisional reference command when the correction reference command is not selected, and the reference command in either case is supplied to the pulse width modulation control unit.

9. The renewable energy resources integrating power conversion apparatus according to claim 8, wherein the power change deciding unit includes a first power calculating unit that calculates output power from the voltage and the current of the output of the inverter, a second power calculating unit that calculates input power from the voltage and the current of the input to the inverter, a comparing-determining unit that determines whether or not an absolute value of a difference between the output power calculated by the first power calculating unit and the input power calculated by the second power calculating unit exceeds a threshold value defined in advance, a flag generating unit that outputs the flag signal when the comparing-determining unit determines that the absolute value of the difference between the output power and the input power exceeds the threshold value, and an output power change command unit that outputs the correction output power command and the signal of change amount of the correction output power command based on the input power and the output power command when the flag signal is output.

10. The renewable energy resources integrating power conversion apparatus according to claim 9, wherein
the output power change command unit includes
an absolute value calculating unit that calculates an absolute value of a difference between the output power command and the input power,
a switching unit that switches the input power and the output power command based on whether or not the flag signal is present, and outputs the correction output power command, and
a holding unit that stores and holds an output signal of the absolute value calculating unit by the flag signal.

11. The renewable energy resources integrating power conversion apparatus according to claim 8, wherein
the virtual impedance value deciding unit converts the signal of change amount of the correction output power command to the virtual impedance value and outputs the virtual impedance value.

* * * * *